(12) United States Patent
Enomoto et al.

(10) Patent No.: US 10,391,834 B2
(45) Date of Patent: Aug. 27, 2019

(54) AIR CONDITIONER

(71) Applicant: DENSO CORPORATION, Kariya, Aichi-pref. (JP)

(72) Inventors: Norihiko Enomoto, Kariya (JP); Nobuharu Kakehashi, Kariya (JP); Kazutoshi Kuwayama, Kariya (JP); Masamichi Makihara, Kariya (JP); Takashi Yamanaka, Kariya (JP); Yasumitsu Omi, Kariya (JP); Koji Miura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 323 days.

(21) Appl. No.: 15/114,880

(22) PCT Filed: Jan. 19, 2015

(86) PCT No.: PCT/JP2015/000204
§ 371 (c)(1),
(2) Date: Jul. 28, 2016

(87) PCT Pub. No.: WO2015/115049
PCT Pub. Date: Aug. 6, 2015

(65) Prior Publication Data
US 2016/0339761 A1    Nov. 24, 2016

(30) Foreign Application Priority Data

Jan. 29, 2014 (JP) ................................. 2014-014688

(51) Int. Cl.
*B60H 1/00* (2006.01)
*F25B 25/00* (2006.01)
*F25B 40/00* (2006.01)

(52) U.S. Cl.
CPC ..... *B60H 1/00899* (2013.01); *B60H 1/00278* (2013.01); *F25B 25/005* (2013.01);
(Continued)

(58) Field of Classification Search
CPC .................................................. B60H 1/00899
See application file for complete search history.

(56) References Cited

U.S. PATENT DOCUMENTS

| 6,718,791 B2 * | 4/2004 | Sakuma | ............. B60H 1/00899 62/196.4 |
|---|---|---|---|
| 2003/0031905 A1 * | 2/2003 | Saito | ................. H01M 8/04007 429/429 |

(Continued)

FOREIGN PATENT DOCUMENTS

| JP | 2006003079 A | 1/2006 |
|---|---|---|
| JP | 2013500903 A | 1/2013 |
| JP | 2013060190 A | 4/2013 |

*Primary Examiner* — Christopher R Zerphey
*Assistant Examiner* — Schyler S Sanks
(74) *Attorney, Agent, or Firm* — Harness, Dickey & Pierce, P.L.C.

(57) ABSTRACT

An air conditioner includes: a heat-medium air heat exchanger that exchanges sensible heat between a heat medium having a temperature adjusted by the heat-medium temperature adjuster and ventilation air blowing to a space to be air-conditioned; a heat transfer portion having a flow path through which the heat medium circulates to transfer heat with the heat medium having the temperature adjusted by the heat-medium temperature adjuster; a large-inner-diameter pipe that forms a heat-medium flow path between the heat-medium temperature adjuster and the heat transfer portion; and a small-inner-diameter pipe that forms a heat-medium flow path between the heat-medium temperature adjuster and the heat-medium air heat exchanger. The small-inner-diameter pipe has small inner diameters $\phi H$ and $\phi C$, compared to the large-inner-diameter pipe.

11 Claims, 20 Drawing Sheets

(a)  (b)  (c)

(52) U.S. Cl.
CPC .............. *B60H 2001/00307* (2013.01); *B60H 2001/00928* (2013.01); *F25B 40/00* (2013.01); *F25B 2339/047* (2013.01); *F25B 2700/1931* (2013.01); *F25B 2700/1933* (2013.01); *F25B 2700/21151* (2013.01); *F25B 2700/21152* (2013.01)

(56) References Cited

U.S. PATENT DOCUMENTS

| | | | |
|---|---|---|---|
| 2011/0197611 A1* | 8/2011 | Hall | B60H 1/00378 62/238.7 |
| 2012/0174602 A1 | 7/2012 | Olivier et al. | |
| 2013/0061627 A1 | 3/2013 | Neumeister et al. | |
| 2014/0138044 A1* | 5/2014 | Kawakami | B60H 1/00278 165/11.1 |

\* cited by examiner

INNER DIAMETER OF PIPE φ16

| FLOW RATE (L/min) | 5 | 10 | 15 |
|---|---|---|---|
| PRESSURE LOSS (kPa) | 0.8 | 3.4 | 7 |
| PUMP POWER (W) | 0.4 | 2.1 | 5 |

INNER DIAMETER OF PIPE φ8

| FLOW RATE (L/min) | 5 | 10 | 15 |
|---|---|---|---|
| PRESSURE LOSS (kPa) | 22.9 | 77 | 156.4 |
| PUMP POWER (W) | 11.7 | 46.1 | 113 |

WARMING-UP/COOLING-DOWN STATE

STEADY-AIR-HEATING/HEAT-STORAGE-USE AIR-HEATING STATE

DEHUMIDIFICATION AND AIR-HEATING STATE

WARMING-UP/STEADY-AIR-COOLING/
COLD-STORAGE-USE AIR-COOLING STATE

AIR CONDITIONER

CROSS REFERENCE TO RELATED APPLICATIONS

This application is a U.S. National Phase Application under 35 U.S.C. 371 of International Application No. PCT/JP2015/000204 filed on Jan. 19, 2015 and published in Japanese as WO 2015/115049 A1 on Aug. 6, 2015. This application is based on and claims the benefit of priority from Japanese Patent Application No. 2014-014688 filed on Jan. 29, 2014. The entire disclosures of all of the above applications are incorporated herein by reference.

FIELD OF THE INVENTION

The present disclosure relates to an air conditioner that blows conditioned air into a space to be air-conditioned.

BACKGROUND ART

Conventionally, air conditioners for vehicles generally include refrigerant-air heat exchangers that exchange heat between the refrigerant in a refrigeration cycle and ventilation air to be blown into a vehicle compartment.

On the other hand, Patent Document 1 discloses a vehicle air conditioner that includes a refrigerant-coolant heat exchanger to exchange heat between a refrigerant and a coolant in the refrigeration cycle and an air-conditioning mechanism to perform air-conditioning of the vehicle interior using the coolant having exchanged heat at the refrigerant-coolant heat exchanger.

RELATED ART DOCUMENT

Patent Document

[Patent Document 1] Japanese Unexamined Patent Application Publication No. 2013-60190

SUMMARY OF INVENTION

Based on studies by the inventors of the present disclosure, compared to the conventional refrigerant-air heat exchanger, the air conditioner in the above related art (Patent Document 1) must have the coolant (heat medium), a coolant pipe through which the coolant flows, and a coolant-air heat exchanger to exchange sensible heat between the coolant and the ventilation air to be blown into the vehicle interior, which leads to an increase in the number of components, resulting in an increased heat capacity. Thus, the air conditioner in the related art could degrade the response of the air-temperature control. Especially, in quick air-heating (warming up) or quick air-cooling (cooling down) immediately after the start-up of the air-conditioning, the delay of the temperature control becomes remarkable.

As a countermeasure to the above, the capacity of the refrigeration cycle is increased, thereby improving the response of the air-temperature control. However, in this case, the size of the refrigeration cycle device could increase, or the power consumption efficiency could deteriorate.

In view of the foregoing matter, it is an object of the present disclosure to improve the response of the air-temperature control in an air conditioner that performs air-conditioning by exchanging sensible heat between the heat medium and the air.

To achieve the above object, an air conditioner according to a first aspect of the present disclosure includes: a pump adapted to draw and discharge a heat medium; a heat-medium temperature adjuster that cools, heats, or adjusts a temperature of the heat medium; a heat-medium air heat exchanger that exchanges heat between the heat medium having the temperature adjusted by the heat-medium temperature adjuster and ventilation air to be blown into a space to be air-conditioned; a heat transfer portion having a flow path through which the heat medium circulates, the heat transfer portion being adapted to transfer heat with the heat medium having the temperature adjusted by the heat-medium temperature adjuster; a large-inner-diameter pipe that forms a heat-medium flow path between the heat-medium temperature adjuster and the heat transfer portion; and a small-inner-diameter pipe that forms a heat-medium flow path between the heat-medium temperature adjuster and the heat-medium air heat exchanger, the small-inner-diameter pipe having an inner diameter smaller than that of the large-inner-diameter pipe.

With this arrangement, the volumes of the heat-medium pipe and the heat medium between the heat-medium temperature adjuster and the heat-medium air heat exchanger can be reduced, compared to the case in which an inner diameter of a pipe forming a heat-medium flow path between a heat-medium temperature adjuster and a heat-medium air heat exchanger is the same as that of the pipe forming a heat-medium flow path between the heat-medium temperature adjuster and the heat transfer portion. Thus, the thermal capacity of the air conditioner can be reduced. As a result, the response of the air-temperature control can be improved.

An air conditioner according to a second aspect of the present disclosure includes: a pump adapted to draw and discharge a heat medium; a heat-medium temperature adjuster that cools, heats, or adjusts a temperature of the heat medium; a heat-medium air heat exchanger that exchanges heat between the heat medium having the temperature adjusted by the heat-medium temperature adjuster and ventilation air to be blown into a space to be air-conditioned; a heat transfer portion having a flow path through which the heat medium circulates, the heat transfer portion being adapted to transfer heat with the heat medium flowing through the heat-medium air heat exchanger; a large-inner-diameter pipe that forms a heat-medium flow path between the heat-medium air heat exchanger and the heat transfer portion; and a small-inner-diameter pipe that forms a heat-medium flow path between the heat-medium temperature adjuster and the heat-medium air heat exchanger, the small-inner-diameter pipe having an inner diameter smaller than that of the large-inner-diameter pipe.

With this arrangement, the volumes of the heat-medium pipe and the heat medium between the heat-medium temperature adjuster and the heat-medium air heat exchanger can be reduced, compared to the case in which an inner diameter of a pipe forming a heat-medium flow path between a heat-medium temperature adjuster and a heat-medium air heat exchanger is the same as that of the pipe forming the heat-medium flow path between the heat-medium air heat exchanger and the heat transfer portion. Thus, the thermal capacity of the air conditioner can be reduced. As a result, the response of the air-temperature control can be improved.

An air conditioner according to a third aspect of the present disclosure includes: a first pump and a second pump adapted to draw and discharge a heat medium; a compressor adapted to draw and discharge a refrigerant; a heat-medium heating heat exchanger that heats the heat medium by exchanging heat between the refrigerant discharged from the compressor and the heat medium discharged from the second pump; a decompression device that decompresses and expands the refrigerant flowing out of the heat-medium heating heat exchanger; a heat-medium cooling heat exchanger that cools the heat medium by exchanging heat between the refrigerant decompressed and expanded by the decompression device and the heat medium discharged from the first pump; a heat-medium outside-air heat exchanger that exchanges heat between the heat medium and outside air; an air-cooling heat exchanger that cools ventilation air by exchanging sensible heat between the heat medium cooled by the heat-medium cooling heat exchanger and the ventilation air blowing to a space to be air-conditioned; an air-heating heat exchanger that heats the ventilation air by exchanging sensible heat between the heat medium heated by the heat-medium heating heat exchanger and the ventilation air blowing to the space to be air-conditioned; a heat transfer portion having a flow path through which the heat medium circulates, the heat transfer portion being adapted to transfer heat with the heat medium; a switching device that switches between a state in which the heat medium circulates through the heat-medium heating heat exchanger and a state in which the heat medium circulates through the heat-medium cooling heat exchanger, with respect to each of the heat-medium outside-air heat exchanger and the heat transfer portion; a large-inner-diameter pipe that forms a heat-medium flow path between the switching device and the heat transfer portion; a cooling side small-inner-diameter pipe forming a heat-medium flow path between the heat-medium cooling heat exchanger and the air-cooling heat exchanger, the cooling side small-inner-diameter pipe having an inner diameter, smaller than that of the large-inner-diameter pipe; and a heating side small-inner-diameter pipe forming a heat-medium flow path between the heat-medium heating heat exchanger and the air-heating heat exchanger, the heating side small-inner-diameter pipe having an inner diameter smaller than that of the large-inner-diameter pipe.

Thus, the same functions and effects as those in the above-mentioned first aspect can be exhibited by the air conditioner that can switch between a state in which the heat medium circulates through the heat-medium heating heat exchanger and a state in which the heat medium circulates through the heat-medium cooling heat exchanger, with respect to each of the heat-medium outside-air heat exchanger and the heat transfer portion.

An air conditioner according to a fourth aspect of the present disclosure includes: a pump adapted to draw and discharge a heat medium; a heat-medium cooling heat exchanger that cools the heat medium by exchanging heat between a low-pressure side refrigerant in a refrigeration cycle and the heat medium; an air-cooling heat exchanger that cools ventilation air by exchanging heat between the heat medium cooled by the heat-medium cooling heat exchanger and the ventilation air blowing to a space to be air-conditioned; a heat-medium heating portion that heats the heat medium using waste heat from an engine; an air-heating heat exchanger that heats the ventilation air by exchanging heat between the heat medium heated by the heat-medium heating portion and the ventilation air; a heating-side pipe forming a heat-medium flow path between the heat-medium heating portion and the air-heating heat exchanger; and a cooling-side pipe forming a heat-medium flow path between the heat-medium cooling heat exchanger and the air-cooling heat exchanger, the cooling-side pipe having an inner diameter smaller than that of the heating-side pipe.

With this arrangement, the volumes of the heat-medium pipe and the heat medium between the heat-medium cooling heat exchanger and the air-cooling heat exchanger can be reduced, compared to the case in which an inner diameter of a cooling side pipe forming a heat-medium flow path between a heat-medium cooling heat exchanger and an air-cooling heat exchanger is the same as that of a heating side pipe forming a heat-medium flow path between a heat-medium heating portion and an air-heating heat exchanger. Thus, the thermal capacity of the air conditioner can be reduced. As a result, the response of the air-temperature control in the air-cooling heat exchanger can be improved.

DESCRIPTION OF EMBODIMENTS

Figure 1:
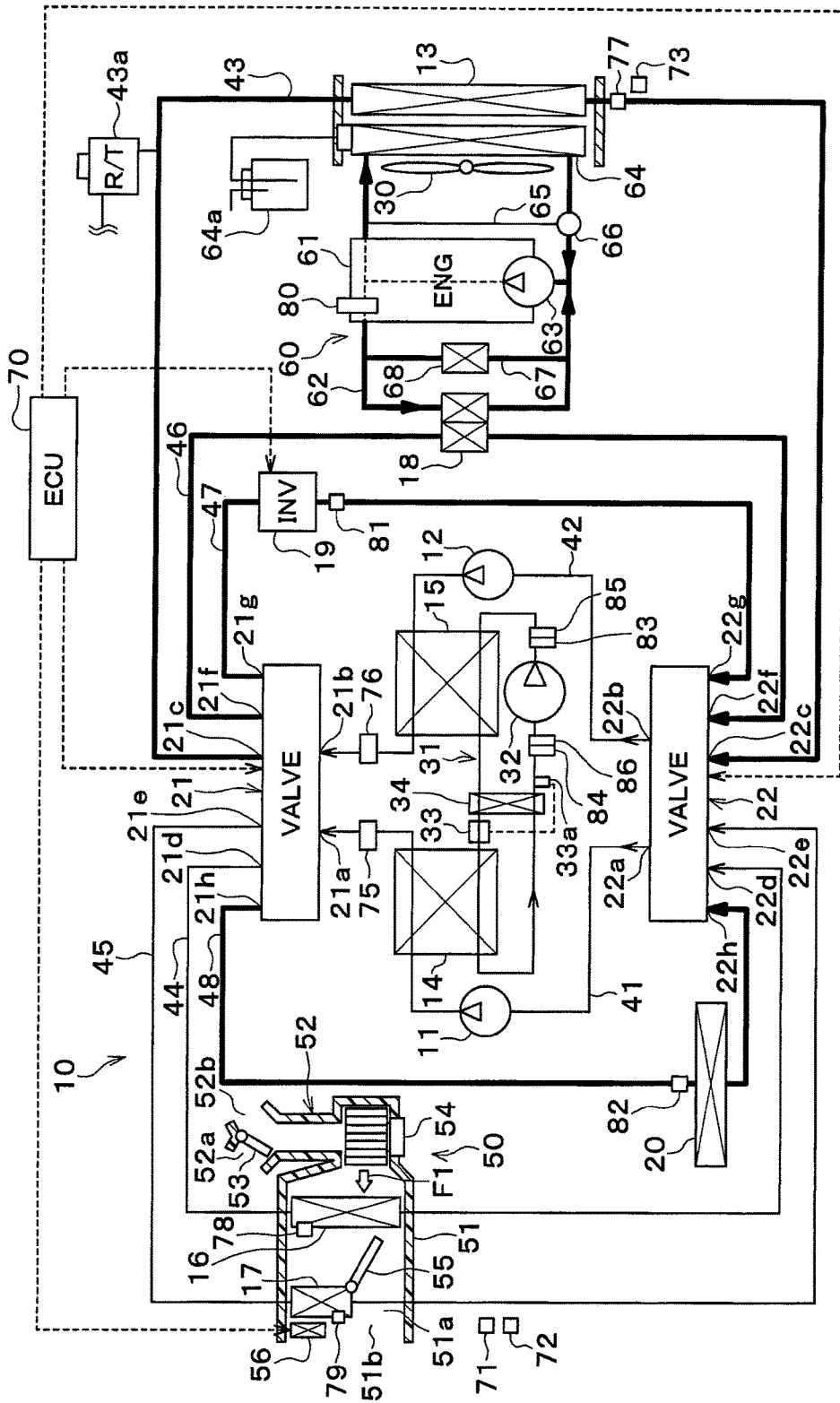
FIG. 1 is an entire configuration diagram of a vehicle thermal management system according to a first embodiment.

In the following, embodiments will be described with reference to the accompanying drawings. Note that in the respective embodiments below, the same or equivalent parts are indicated by the same reference characters throughout the figures.

First Embodiment

A vehicle thermal management system 10 shown in FIG. 1 is used to adjust various devices mounted on the vehicle or the vehicle interior to an appropriate temperature. In this embodiment, the vehicle thermal management system 10 is applied to a hybrid vehicle that can obtain the driving force for vehicle-traveling from both an engine (internal combustion engine) and a traveling electric motor (motor generator).

The hybrid car of this embodiment is configured as a plug-in hybrid car that can charge the battery (vehicle-mounted battery) mounted on the vehicle, with power supplied from an external power source (commercial power source) during stopping of the vehicle. For example, a lithium ion battery can be used as the battery.

The driving force output from the engine is used not only as a driving force for vehicle traveling but also for operating a power generator. Power generated by the generator and power supplied from an external power source can be stored in the battery. The battery can also store the power regenerated (regenerated energy) by the electric motor for traveling during deceleration or descending a slope.

Power stored in the battery is supplied not only to the traveling electric motor, but also various vehicle-mounted devices, including electric components installed in the vehicle thermal management system 10.

A plug-in hybrid vehicle is brought into an EV traveling mode when the state of charge SOC of the battery is equal to or more than a prescribed traveling reference remaining level upon start of traveling by charging the battery with power from the external power source during stopping of the vehicle before the startup. The EV traveling mode is a mode in which the vehicle travels by the driving force output from the traveling electric motor.

On the other hand, when the state of charge SOC of the battery is lower than the traveling reference remaining level during traveling, the vehicle is brought into an HV traveling mode. The HV traveling mode is a traveling mode in which the vehicle is traveling by the driving force output mainly from an engine 61. When the load on traveling vehicle becomes high, the traveling electric motor is operated to assist the engine 61.

The plug-in hybrid vehicle of this embodiment switches between the EV traveling mode and the HV traveling mode in this way to suppress the consumption of fuel by the engine 61, thereby improving the fuel efficiency of the vehicle, as compared to normal vehicles that can obtain the driving force for traveling only from the engine 61. A driving controller (not shown) controls switching between the EV traveling mode and the HV traveling mode.

As shown in FIG. 1, the vehicle thermal management system 10 includes a first pump 11, a second pump 12, a radiator 13, a coolant cooler 14, a coolant heater 15, a cooler core 16, a heater core 17, a coolant-to-coolant heat exchanger 18, an inverter 19, a battery-temperature adjustment heat exchanger 20, a first switching valve 21, and a second switching valve 22.

Each of the first pump 11 (low-temperature side pump) and the second pump 12 (high-temperature side pump) is an electric pump that draws and discharges the coolant (heat medium). The coolant is a fluid as the heat medium. In this embodiment, a liquid containing at least ethylene glycol, dimethylpolysiloxane or a nanofluid, or an antifreezing solution is used as the coolant.

The radiator 13, the coolant cooler 14, the coolant heater 15, the cooler core 16, the heater core 17, the coolant-to-coolant heat exchanger 18, the inverter 19, and the battery-temperature adjustment heat exchanger 20 are coolant circulation devices (heat-medium circulation devices) through which the coolant circulates.

The radiator 13 is a coolant outside-air heat exchanger (heat-medium outside-air heat exchanger) that exchanges heat (exchanges sensible heat) between the coolant and the vehicle exterior air (hereinafter referred to as the outside air). The coolant at a temperature equal to or higher than the outside air temperature is allowed to flow through the radiator 13, thereby enabling the heat dissipation from the coolant into the outside air. The coolant at a temperature equal to or lower than the outside air temperature is allowed to flow through the radiator 13, thereby enabling the heat absorption from the outside air into the coolant. In other words, the radiator 13 can exhibit the function of a radiator that dissipates heat from the coolant into the outside air, and the function of a heat absorbing device that absorbs heat from the outside air into the coolant.

The radiator 13 is a heat transfer device (heat transfer portion) that has a flow path through which the coolant circulates and transfers heat with the coolant having its temperature adjusted by the coolant cooler 14 or coolant heater 15.

An exterior blower 30 is an electric blower (outside-air blower) that blows out the outside air to the radiator 13. The radiator 13 and the exterior blower 30 are disposed at the forefront of the vehicle. Thus, traveling air can hit the radiator 13 during traveling of the vehicle.

Each of the coolant cooler 14 and the coolant heater 15 is the coolant-temperature adjustment heat exchanger (heat-medium temperature adjuster) that adjusts the temperature of coolant by exchanging heat with the coolant. The coolant cooler 14 is a coolant-cooling heat exchanger (heat-medium cooling heat exchanger) for cooling the coolant. The coolant heater 15 is a coolant-heating heat exchanger (heat-medium heating heat exchanger) for heating the coolant.

The coolant cooler 14 is a low-pressure side heat exchanger (heat-medium heat absorbing device) that absorbs heat in a low-pressure side refrigerant from the coolant by exchanging heat between the coolant and the low-pressure refrigerant of a refrigeration cycle 31. The coolant cooler 14 serves as an evaporator of the refrigeration cycle 31.

The refrigeration cycle 31 is a vapor-compression refrigerator that includes a compressor 32, the coolant heater 15, an expansion valve 33, the coolant cooler 14, and an internal heat exchanger 34. The refrigeration cycle 31 of this embodiment forms a subcritical refrigeration cycle in which a high-pressure side refrigerant pressure does not exceed the critical pressure of the refrigerant, using a fluorocarbon refrigerant as the refrigerant.

The compressor 32 is an electric compressor driven by power supplied from the battery. The compressor 32 draws and compresses the refrigerant in the refrigeration cycle 31 to discharge the compressed refrigerant therefrom.

The coolant heater 15 is a condenser that condenses (changes a latent heat of) a high-pressure side refrigerant by exchanging heat between the high-pressure side refrigerant discharged from the compressor 32 and the coolant.

The expansion valve 33 is a decompression device that decompresses and expands a liquid-phase refrigerant flowing out of the coolant heater 15. The expansion valve 33 is a thermal expansion valve that has a temperature sensor 33a for detecting the superheat degree of the refrigerant on the outlet side of the coolant cooler 14 based on the temperature and pressure of the refrigerant on the outlet side of the coolant cooler 14. The expansion valve 33 is adapted to adjust a throttle passage area by a mechanical mechanism such that the superheat degree of the refrigerant on the outlet side of the coolant cooler 14 is within a predetermined range that is previously set.

The coolant cooler 14 is an evaporator that evaporates (changes latent heat of) a low-pressure refrigerant by exchanging heat between the coolant and the low-pressure refrigerant decompressed and expanded by the expansion valve 33. The gas-phase refrigerant evaporated at the coolant cooler 14 is drawn into and compressed by the compressor 32.

The internal heat exchanger 34 is a heat exchanger that exchanges heat between the refrigerant flowing out of the coolant heater 15 and the refrigerant flowing out of the coolant cooler 14.

The refrigeration cycle 31 is a coolant cooling-heating portion (heat-medium cooling-heating portion) that has the coolant cooler 14 for cooling the coolant and the coolant heater 15 for heating the coolant. In other words, the refrigeration cycle 31 serves as a low-temperature coolant generator (low-temperature heat-medium generator) that generates a low-temperature coolant at the coolant cooler 14, and also as a high-temperature coolant generator (high-temperature heat-medium generator) that generates a high-temperature coolant at the coolant heater 15.

The radiator 13 serves to cool the coolant by the outside air, while the coolant cooler 14 serves to cool the coolant by the low-pressure refrigerant in the refrigeration cycle 31. Thus, the temperature of the coolant cooled by the coolant cooler 14 can be made lower than that of the coolant cooled by the radiator 13. Specifically, the radiator 13 cannot cool the coolant to a temperature lower than that of the outside air, whereas the coolant cooler 14 can cool the coolant to a temperature lower than that of the outside air.

The cooler core 16 and the heater core 17 are heat-medium air heat exchangers that exchange heat between the coolant having its temperature adjusted by the coolant cooler 14 and the coolant heater 15 and the ventilation air to be blown into the vehicle interior, thereby adjusting the temperature of the ventilation air.

The cooler core 16 is an air-cooling heat exchanger that cools ventilation air into the vehicle interior by exchanging heat (exchanging sensible heat) between the coolant and the ventilation air into the vehicle interior. The heater core 17 is an air-heating heat exchanger that heats ventilation air into the vehicle interior by exchanging heat (exchanging sensible heat) between the coolant and the ventilation air into the vehicle interior.

The coolant-to-coolant heat exchanger 18, the inverter 19, and the battery-temperature adjustment heat exchanger 20 are heat transfer devices (temperature-adjustment target devices) that have flow paths for circulation of the coolant and transfer heat with respect to the coolant.

The coolant-to-coolant heat exchanger 18 is a heat exchanger (heat-medium-to-heat-medium heat exchanger) that exchanges heat between the coolant in the vehicle thermal management system 10 (the coolant circulating by the first pump 11 or second pump 12) and the coolant (engine heat medium) in an engine cooling circuit 60.

The coolant-to-coolant heat exchanger 18 constitutes an engine heat transfer portion (heat transfer portion) that transfers heat between the engine 61 and the coolant circulating through the first pump 11 or second pump 12.

The coolant-to-coolant heat exchanger 18 is a coolant heater (heat-medium heater) that heats the coolant using waste heat from the engine 61.

The inverter 19 is a power converter that converts a direct-current (DC) power supplied from the battery into an alternating-current (AC) voltage to output the AC voltage to the traveling electric motor. The inverter 19 is a heat generator that generates heat during its operation. The coolant flow path in the inverter 19 serves as an inverter heat transfer portion (heat transfer portion) that transfers heat between an inverter element and the coolant.

The battery-temperature adjustment heat exchanger 20 is a heat exchanger (heat-medium air heat exchanger) disposed in a ventilation-air route to the battery and adapted to exchange heat between the ventilation air and the coolant. The battery-temperature adjustment heat exchanger 20 constitutes a battery heat transfer portion (heat transfer portion) that transfers heat between the battery and the coolant.

The first pump 11 is disposed in a first-pump flow path 41. The coolant cooler 14 is disposed on the discharge side of the first pump 11 in the first-pump flow path 41.

The second pump 12 is disposed in a second-pump flow path 42. The coolant heater 15 is disposed on the discharge side of the second pump 12 in the second-pump flow path 42.

The radiator 13 is disposed in a radiator flow path 43. The cooler core 16 is disposed in a cooler-core flow path 44. The heater core 17 is disposed in a heater-core flow path 45.

The coolant-to-coolant heat exchanger 18 is disposed in a coolant-to-cooler heat exchanger flow path 46. The inverter 19 is disposed in an inverter flow path 47. The battery-temperature adjustment heat exchanger 20 is disposed in a battery-heat-exchange flow path 48.

The first-pump flow path 41, the second-pump flow path 42, the radiator flow path 43, the cooler-core flow path 44, the heater-core flow path 45, the coolant-to-coolant heat exchanger flow path 46, the inverter flow path 47, and the battery-heat-exchange flow path 48 are coolant flow paths (heat-medium flow paths) through which the coolant flows.

A reserve tank 43a is connected to the radiator flow path 43. The reserve tank 43a is an air release container (heat-medium reservoir) for storing the coolant therein. Thus, the pressure at the liquid surface of the coolant stored in the reserve tank 43a becomes atmospheric pressure.

The reserve tank 43a may be configured such that the pressure at the liquid surface of the coolant stored therein becomes a predetermined pressure (pressure different from the atmospheric pressure).

Excessive coolant is stored in the reserve tank 43a, which can suppress the decrease in liquid amount of the coolant circulating through the respective flow paths. The reserve tank 43a has a function of separating the air bubbles contained in the coolant, into gas and liquid.

The first-pump flow path 41, the second-pump flow path 42, the radiator flow path 43, the cooler-core flow path 44, the heater-core flow path 45, the coolant-to-coolant heat exchanger flow path 46, the inverter flow path 47, and the battery-heat-exchange flow path 48 are connected to the first switching valve 21 and the second switching valve 22. Each of the first and second switching valves 21 and 22 is a switching device that switches the flow of the coolant (coolant circulation state).

The first switching valve 21 has a first inlet 21a and a second inlet 21b as inlets for the coolant, as well as a first outlet 21c, a second outlet 21d, a third outlet 21e, a fourth outlet 21f, a fifth outlet 21g, and a sixth outlet 21h as outlets for the coolant.

The second switching valve 22 has a first outlet 22a and a second outlet 22b as the outlet for the coolant, and a first inlet 22c, a second inlet 22d, a third inlet 22e, a fourth inlet 22f, a fifth inlet 22g, and a sixth inlet 22h as the inlet for the coolant.

The first inlet 21a of the first switching valve 21 is connected to one end of the first-pump flow path 41. In other words, the first inlet 21a of the first switching valve 21 is connected to the coolant outlet side of the coolant cooler 14.

The second inlet 21b of the first switching valve 21 is connected to one end of the second-pump flow path 42. In other words, the second inlet 21b of the first switching valve 21 is connected to the coolant outlet side of the coolant heater 15.

The first outlet 21c of the first switching valve 21 is connected to one end of the radiator flow path 43. In other words, the first outlet 21c of the first switching valve 21 is connected to the coolant inlet side of the radiator 13.

The second outlet 21d of the first switching valve 21 is connected to one end of the cooler-core flow path 44. In other words, the second outlet 21d of the first switching valve 21 is connected to the coolant inlet side of the cooler core 16.

The third outlet 21e of the first switching valve 21 is connected to one end of the heater-core flow path 45. In other words, the third outlet 21e of the first switching valve 21 is connected to the coolant inlet side of the heater core 17.

The fourth outlet 21f of the first switching valve 21 is connected to one end of the coolant-to-coolant heat exchanger flow path 46. In other words, the fourth outlet 21f of the first switching valve 21 is connected to the coolant inlet side of the coolant-to-coolant heat exchanger 18.

The fifth outlet 21g of the first switching valve 21 is connected to one end of the inverter flow path 47. In other words, the fifth outlet 21g of the first switching valve 21 is connected to the coolant inlet side of the inverter 19.

The sixth outlet 21h of the first switching valve 21 is connected to one end of the battery-heat-exchange flow path 48. In other words, the sixth outlet 21h of the first switching valve 21 is connected to the coolant inlet side of the battery-temperature adjustment heat exchanger 20.

The first outlet 22a of the second switching valve 22 is connected to the other end of the first-pump flow path 41. In other words, the first outlet 22a of the second switching valve 22 is connected to the coolant suction side of the first pump 11.

The second outlet 22b of the second switching valve 22 is connected to the other end of the second-pump flow path 42. In other words, the second outlet 22b of the second switching valve 22 is connected to the coolant suction side of the second pump 12.

The first inlet 22c of the second switching valve 22 is connected to the other end of the radiator flow path 43. In other words, the first inlet 22c of the second switching valve 22 is connected to the coolant outlet side of the radiator 13.

The second inlet 22d of the second switching valve 22 is connected to the other end of the cooler-core flow path 44. In other words, the second inlet 22d of the second switching valve 22 is connected to the coolant outlet side of the cooler core 16.

The third inlet 22e of the second switching valve 22 is connected to the other end of the heater-core flow path 45. In other words, the third inlet 22e of the second switching valve 22 is connected to the coolant outlet side of the heater core 17.

The fourth inlet 22f of the second switching valve 22 is connected to the other end of the coolant-to-coolant heat exchanger flow path 46. In other words, the fourth inlet 22f of the second switching valve 22 is connected to the coolant outlet side of the coolant-to-coolant heat exchanger 18.

The fifth inlet 22g of the second switching valve 22 is connected to the other end of the inverter flow path 47. In other words, the fifth inlet 22g of the second switching valve 22 is connected to the coolant outlet side of the inverter 19.

The sixth inlet 22h of the second switching valve 22 is connected to the other end of the battery-heat-exchange flow path 48. In other words, the sixth inlet 22h of the second switching valve 22 is connected to the coolant outlet side of the battery-temperature adjustment heat exchanger 20.

The first switching valve 21 and the second switching valve 22 can be configured to arbitrarily or selectively switch the communication states between each inlet and outlet.

Specifically, the first switching valve 21 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to each of the radiator 13, the cooler core 16, the heater core 17, the coolant-to-coolant heat exchanger 18, the inverter 19, and the battery-temperature adjustment heat exchanger 20.

The second switching valve 22 switches among a state in which the coolant flows out to the first pump 11, a state in which the coolant flows out to the second pump 12, and a state in which the coolant flows out to neither the first pump 11 nor the second pump 12, with respect to each of the radiator 13, the cooler core 16, the heater core 17, the coolant-to-coolant heat exchanger 18, the inverter 19, and the battery-temperature adjustment heat exchanger 20.

The first switching valve 21 and the second switching valve 22 are capable of adjusting their valve opening degrees. In this way, the first and second switching valves 21 and 22 can adjust the flow rates at which the coolant flows through the radiator 13, the cooler core 16, the heater core 17, the coolant-to-coolant heat exchanger 18, the inverter 19, and the battery-temperature adjustment heat exchanger 20.

That is, the first switching valve 21 and the second switching valve 22 are flow-rate adjustment portions that adjust the flow rate of the coolant for each of the radiator 13, the cooler core 16, the heater core 17, the coolant-to-coolant heat exchanger 18, the inverter 19, and the battery-temperature adjustment heat exchanger 20.

The first switching valve 21 is capable of mixing the coolant discharged from the first pump 11 and the coolant discharged from the second pump 12 at any flow-rate ratio, thereby allowing the mixed coolant to flow into the radiator 13, the cooler core 16, the heater core 17, the coolant-to-coolant heat exchanger 18, the inverter 19, and the battery-temperature adjustment heat exchanger 20.

That is, the first switching valve 21 and the second switching valve 22 serve as flow-rate ratio adjustment portions that adjust the flow-rate ratio of the coolant cooled by the coolant cooler 14 to that heated by the coolant heater 15 with respect to each of the radiator 13, the cooler core 16, the heater core 17, the coolant-to-coolant heat exchanger 18, the inverter 19, and the battery-temperature adjustment heat exchanger 20.

The first switching valve 21 and the second switching valve 22 may be integrally formed, and a valve driving source may be shared therebetween. Alternatively, the first switching valve 21 and the second switching valve 22 may be configured of a combination of a number of valves.

The cooler core 16 and the heater core 17 are accommodated in a casing 51 of an interior air-conditioning unit 50 in the vehicle air conditioner.

The casing 51 forms an air passage for the ventilation air to be blown into the vehicle interior. The casing 51 is formed of resin (for example, polypropylene) with some elasticity and excellent strength. An inside/outside air switching case 52 is disposed at the most upstream side of air flow in the casing 51. The inside/outside air switching case 52 is an inside/outside air introduction portion that switches between the inside air (air in a vehicle compartment) and the outside air (air outside the vehicle compartment) to introduce the switched air.

The inside/outside air switching case 52 has an inside-air suction port 52a for introducing the inside air into the casing 51, and an outside-air suction port 52b for introducing the outside air into the casing 51. An inside/outside air switching door 53 is disposed inside the inside/outside air switching case 52.

The inside/outside air switching door 53 serves as an air-volume ratio changing portion that changes the ratio of the volume of inside air to that of outside air to be introduced into the casing 51. Specifically, the inside/outside air switching door 53 continuously adjusts the opening areas of the inside-air suction port 52a and the outside-air suction port 52b, thereby changing the ratio of the volume of the inside air to that of the outside air. The inside/outside air switching door 53 is driven by an electric actuator (not shown).

An interior blower (blower) 54 is disposed downstream of the air flow in the inside/outside air switching case 52. The interior blower 54 blows air (inside air and outside air) drawn via the inside/outside air switching case 52, into the vehicle interior. The interior blower 54 is an electric blower that includes a centrifugal multiblade fan (sirocco fan) to be driven by an electric motor.

The cooler core 16, the heater core 17, and an auxiliary heater 56 are disposed on the downstream side of the air flow from the interior blower 54 in the casing 51. The auxiliary heater 56 is a PTC heater (electric heater) that has a PTC element (positive thermistor) and heat the air by generating heat through supply of the electric power to the PTC element.

A heater-core bypass passage 51a is formed in the downstream side position of the air flow through the cooler core 16 within the casing 51. The heater-core bypass passage 51a is an air passage that allows the air having passed through the cooler core 16 to flow without passing through the heater core 17 or the auxiliary heater 56.

An air mix door 55 is disposed between the cooler core 16 and the heater core 17 within the casing 51.

The air mix door 55 serves as an air-volume ratio adjustment portion that continuously changes the ratio of the volume of the air flowing into the heater core 17 and the auxiliary heater 56 to that of the air flowing into the heater-core bypass passage 51a. The air mix door 55 is, for example, a revolving plate-shaped door, a slidable door, or the like, and driven by an electric actuator (not shown).

The temperature of blowout air to be blown into the vehicle interior is changed depending on the ratio of the volume of the air passing through the heater core 17 and the auxiliary heater 56 to that of the air passing through the heater-core bypass passage 51a. Thus, the air mix door 55 serves as a temperature adjustment portion adapted to adjust the temperature of the blowout air to be blown into the vehicle interior.

An air outlet 51b for blowing the ventilation air into the vehicle interior as a space to be air-conditioned is disposed on the most downstream side of the air flow of the casing 51. Specifically, a defroster air outlet, a face air outlet, and a foot air outlet are provided as the air outlet 51b.

The defroster air outlet blows the conditioned air toward the inner side of a windshield of the vehicle. The face air outlet blows the conditioned air toward the upper body of an occupant. The foot air outlet blows the conditioned air toward the feet of the occupant.

An air-outlet mode door (not shown) is disposed on the upstream side of the air flow in the air outlet 51b. The air-outlet mode door serves as an air-outlet mode switch for switching the air outlet mode. The air-outlet mode door is driven by the electric actuator (not shown).

The air outlet modes switched by the air-outlet mode door include, for example, a face mode, a bi-level mode, a foot mode, and a foot-defroster mode.

The face mode is the air outlet mode in which the face air outlet is fully opened to blow the air from the face air outlet toward the upper body of the occupant in the vehicle compartment. The bi-level mode is the air outlet mode in which both the face air outlet and foot air outlet are opened to blow air toward the upper body and feet of the occupant in the vehicle compartment.

The foot mode is the air outlet mode in which the foot air outlet is fully opened with the defroster air outlet opened only by a small opening degree to blow the air mainly from the foot air outlet. The foot-defroster mode is the air outlet mode in which the foot air outlet and the defroster air outlet are opened by the same degree to blow the air from both the foot air outlet and the defroster air outlet.

The engine cooling circuit 60 is a coolant circulation circuit for cooling the engine 61.

The engine cooling circuit 60 includes a circulation flow path 62 for allowing the circulation of the coolant. The circulation flow path 62 is provided with the engine 61, an engine pump 63, an engine radiator 64, and the coolant-to-coolant heat exchanger 18.

The engine pump 63 is an electric pump that draws and discharges the coolant. The engine pump 63 may be a mechanical pump driven by a power output from the engine 61.

The engine radiator 64 is a heat-dissipation heat exchanger (heat-medium air heat exchanger) that dissipates heat from the coolant into the outside air by exchanging heat between the coolant and the outside air.

The circulation flow path 62 is connected to a radiator bypass flow path 65. The radiator bypass flow path 65 is a flow path through which the coolant flows while bypassing the engine radiator 64.

A thermostat 66 is positioned in a connection portion between the radiator bypass flow path 65 and the circulation flow path 62. The thermostat 66 is a coolant-temperature responsive valve constructed of a mechanical mechanism designed to open and close a coolant flow path by displacing a valve body using a thermo wax (temperature sensing member) with a changeable volume depending on its temperature.

Specifically, when the temperature of coolant exceeds a predetermined temperature (for example, 80° C. or higher), the thermostat 66 closes the radiator bypass flow path 65. When the temperature of coolant is lower than the predetermined temperature (for example, less than 80° C.), the thermostat 66 opens the radiator bypass flow path 65.

The circulation flow path 62 is connected to an engine-accessory flow path 67. The engine-accessory flow path 67 is a flow path in which the coolant flows in parallel with the coolant-to-coolant heat exchanger 18.

Engine accessories 68 are disposed in the engine-accessory flow path 67. The engine accessories 68 include an oil heat exchanger, an exhaust gas recirculation (EGR) cooler, a throttle cooler (warmer), a turbo cooler, an engine-accessory motor, and the like. The oil heat exchanger is a heat exchanger that adjusts the temperature of oil by exchanging heat between the coolant and the engine oil or transmission oil.

The EGR cooler is a heat exchanger constituting an EGR (exhaust gas recirculation) device that refluxes part of exhaust gas from the engine to the intake side to reduce pumping loss caused by a throttle valve. Specifically, the EGR cooler is the heat exchanger that exchanges heat between recirculated gas and the coolant to thereby adjust the temperature of the recirculated gas.

The throttle cooler (warmer) is a temperature adjuster that adjusts the temperature of throttle valve components by exchanging heat between the throttle valve components and the coolant via a water jacket provided in the throttle. The throttle cooler is provided to protect the throttle valve components from heat damage when a throttle valve is at a high temperature (e.g., 100° C. or higher) and to prevent the throttle valve components from freezing, causing a failure in operation when the throttle valve is at a low temperature (e.g., below zero).

The turbo cooler is a cooler that cools a turbo charger by exchanging heat between heat generated by the turbo charger and the coolant.

An engine auxiliary motor is a large-sized motor for rotating an engine belt even during stopping of the engine. The engine auxiliary motor is used to operate the compressor, water pump, and the like, which are driven by the engine belt, even when no driving force is available from the engine, or upon start-up of the engine.

An engine reserve tank 64a is coupled to the engine radiator 64. The structure and function of the engine reserve tank 64a are the same as those of the above-mentioned reserve tank 43a.

Figure 2:
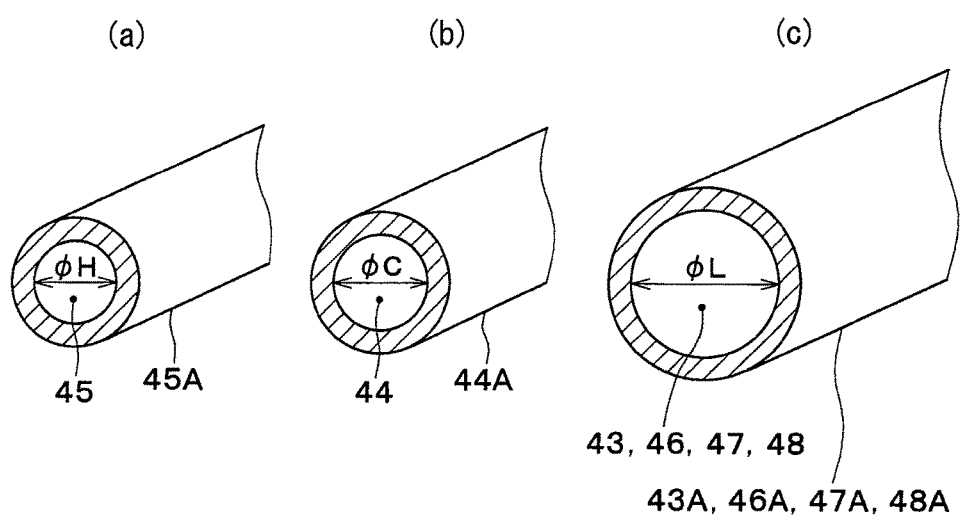
FIGS. 2(a), 2(b), and 2(c) are perspective cross-sectional views showing the magnitude relationship among the diameters of respective flow paths in the first embodiment.

FIG. 2 shows the magnitude relationship among the diameters of the radiator flow path 43, the cooler-core flow path 44, the heater-core flow path 45, the coolant-to-coolant heat exchanger flow path 46, the inverter flow path 47, and the battery-heat-exchange flow path 48.

As shown in FIGS. 2(*a*), (*b*), and (*c*), each of a diameter $\phi H$ of the heater-core flow path 45 and a diameter $\phi C$ of the cooler-core flow path 44 is smaller than a diameter $\phi L$ of each of the radiator flow path 43, the coolant-to-coolant heat exchanger flow path 46, the inverter flow path 47, and the battery-heat-exchange flow path 48.

In other words, each of the inner diameter $\phi H$ of a heater-core pipe 45A configuring the heater-core flow path 45, and the inner diameter $\phi C$ of a cooler-core pipe 44A configuring the cooler-core flow path 44 is smaller than the inner diameter $\phi L$ of each of a radiator pipe 43A configuring the radiator flow path 43, a coolant-to-coolant heat exchanger pipe 46A configuring the coolant-to-coolant heat exchanger flow path 46, an inverter pipe 47A configuring the inverter flow path 47 and a battery-heat-exchange pipe 48A configuring the battery-heat-exchange flow path 48.

That is, each of the heater-core pipe 45A and the cooler-core pipe 44A is the pipe with a smaller inner diameter, or a small-inner-diameter pipe. On the other hand, each of the radiator pipe 43A, the coolant-to-coolant heat exchanger pipe 46A, the inverter pipe 47A, and the battery-heat-exchange pipe 48A is the pipe with a larger inner diameter, or a large-inner diameter pipe. The heater-core pipe 45A is the heating-side small-inner-diameter pipe, while the cooler-core pipe 44A is the cooling-side small-inner-diameter pipe.

In this example, the inner diameter $\phi H$ of the heater-core pipe 45A is 8 mm, which is smaller than the inner diameter of the conventional standard heater-core pipe of 15 mm. In this example, the inner diameter $\phi C$ of the cooler-core pipe 44A is 10 mm, while the inner diameter $\phi L$ of each of other pipes 43A, 46A, 47A, and 48A is 16 mm. This example of the inner diameter is illustrative only and may take any relationship as long as the relationship of $\phi H < \phi L$ and $\phi C < \phi L$ is satisfied. As shown in FIG. 2, the relationship of $\phi H < \phi C < \phi L$ may also be taken.

Figure 3:
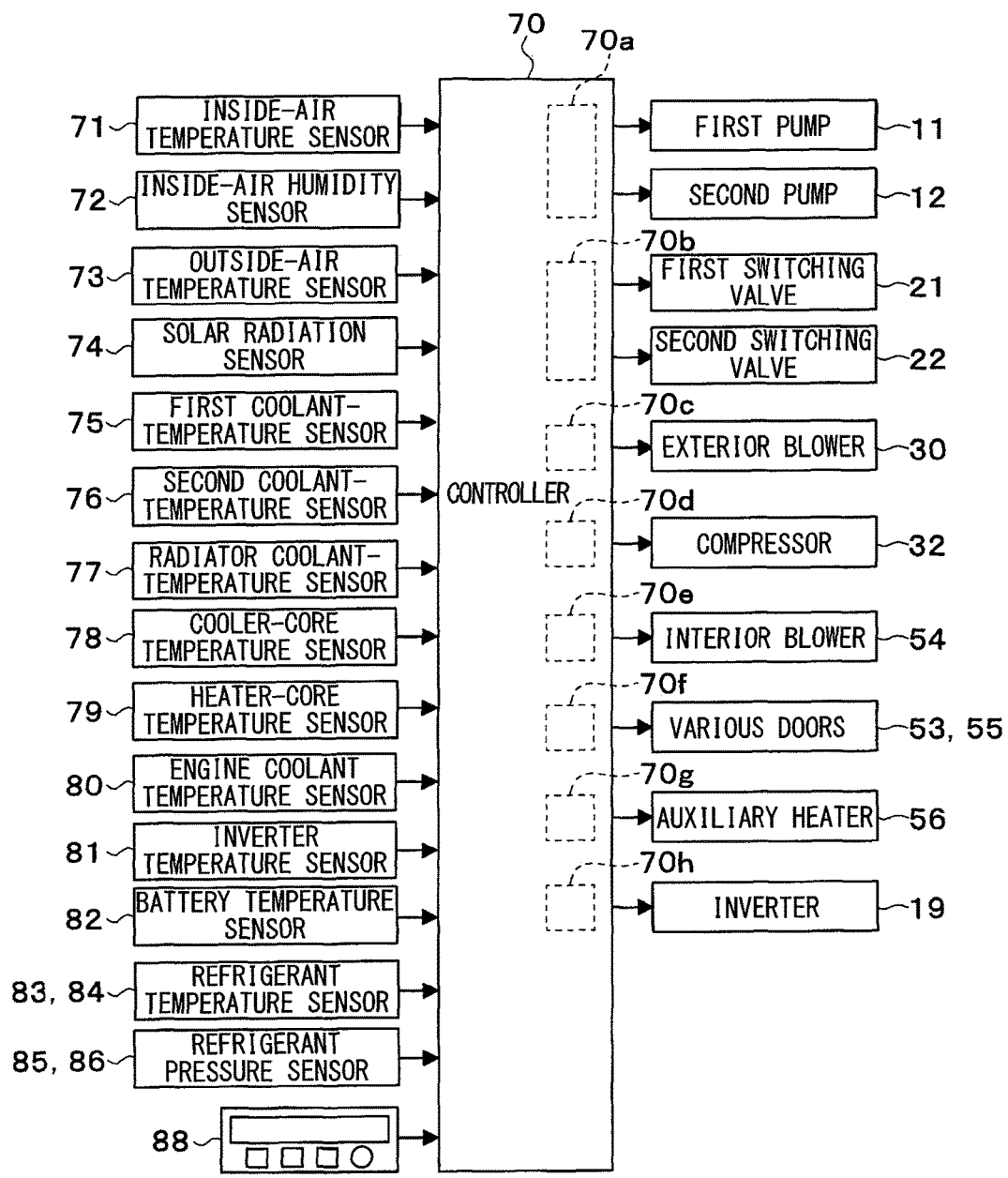
FIG. 3 is a block diagram showing an electric control unit in the vehicle thermal management system in the first embodiment.

Now, an electric control unit of the thermal management system 10 will be described with reference to FIG. 3. A controller 70 is comprised of a known microcomputer, including CPU, ROM, and RAM, and a peripheral circuit thereof. The controller performs various computations and processing based on air-conditioning control programs stored in the ROM to thereby control the operations of various control target devices that are connected to its output side.

The control target devices to be controlled by the controller 70 include the first pump 11, the second pump 12, the first switching valve 21, the second switching valve 22, the exterior blower 30, the compressor 32, the interior blower 54, the electric actuators for driving various doors disposed in the casing 51 (inside/outside air switching door 53, air mix door 55, air-outlet mode door, and the like), and the inverter 19.

The controller 70 is integrally structured with control units for controlling various control target devices connected to the output side of the controller. A structure (hardware and software) adapted to control the operation of each of the control target devices serves as the control unit for controlling the operation of each of the control target devices.

In this embodiment, the structure (hardware and software) that controls the operations of the first pump 11 and the second pump 12 is configured as a pump control unit 70a in the controller 70. The pump control unit 70a is a flow-rate control unit (heat-medium flow-rate control unit) for controlling the flow rate of the coolant flowing through the respective coolant-circulation devices.

In this embodiment, the structure (hardware and software) that controls the operations of the first switching valve 21 and the second switching valve 22 is configured as a switching valve control unit 70b in the controller 70. The switching valve control unit 70b is a flow-rate control unit (heat-medium flow-rate control unit) for controlling the flow rate of the coolant flowing through the respective coolant-circulation devices.

In this embodiment, the structure (hardware and software) that controls the operation of the exterior blower 30 is configured as an exterior blower control unit 70c (outside-air blower control unit) in the controller 70. The exterior blower control unit 70c is an outside-air flow-rate control unit that controls the flow rate of outside air flowing through the radiator 13.

In this embodiment, the structure (hardware and software) that controls the operation of the compressor 32 is configured as a compressor control unit 70d in the controller 70. The compressor control unit 70d is a refrigerant flow-rate control unit that controls the flow rate of refrigerant discharged from the compressor 32.

In this embodiment, the structure (hardware and software) that controls the operation of the interior blower 54 is configured as an interior blower control unit 70e in the controller 70. The interior blower control unit 70e serves as an air-volume control unit that controls the volume of ventilation air to be blown into the vehicle interior.

In this embodiment, the structure (hardware and software) that controls the operations of various doors disposed in the casing 51 (inside/outside air switching door 53, air mix door 55, air-outlet mode door, and the like) is configured as an air-conditioning switching control unit 70f in the controller 70.

The air mix door 55 and the air-conditioning switching control unit 70f serve as the air-volume ratio adjustment portion that adjusts the ratio of the volume of the ventilation air flowing through the heater core 17 to that of the ventilation air bypassing the heater core 17, in all ventilation air cooled by the cooler core 16.

The inside/outside air switching door 53 and the air-conditioning switching control unit 70f serve as inside/outside air ratio adjustment portions that adjust the ratio of the inside air to the outside air in the ventilation air to be blown into the vehicle interior.

In this embodiment, the structure (hardware and software) that controls the operation of the auxiliary heater 56 is configured as an auxiliary heater control unit 70g (electric heater control unit) in the controller 70.

In this embodiment, the structure (hardware and software) that controls the operation of the inverter 19 is configured as an inverter control unit 70h (heat generator control unit) in the controller 70.

The above-mentioned respective control units 70a, 70b, 70c, 70d, 70e, 70f, 70g, and 70h may be separately formed from the controller 70.

Detection signals from a group of sensors are input to the input side of the controller 70. The group of sensors includes an inside-air temperature sensor 71, an inside-air humidity sensor 72, an outside-air temperature sensor 73, a solar radiation sensor 74, a first coolant temperature sensor 75, a second coolant temperature sensor 76, a radiator coolant temperature sensor 77, a cooler-core temperature sensor 78, a heater-core temperature sensor 79, an engine coolant temperature sensor 80, an inverter temperature sensor 81, a battery temperature sensor 82, refrigerant temperature sensors 83 and 84, and refrigerant pressure sensors 85 and 86.

The inside-air temperature sensor 71 is a detector (inside-air temperature detector) for detecting the temperature of inside air (or the temperature of air in the vehicle compartment). The inside-air humidity sensor 72 is a detector (inside-air humidity detector) for detecting the humidity of the vehicle interior.

The outside-air temperature sensor 73 is a detector (outside-air temperature detector) for detecting the temperature of outside air (or the temperature of air outside the vehicle compartment). The solar radiation sensor 74 is a detector (solar radiation amount detector) for detecting the amount of solar radiation into the vehicle interior.

The first coolant temperature sensor 75 is a detector (first heat-medium temperature detector) that detects the temperature of coolant flowing through the first-pump flow path 41 (for example, the temperature of coolant drawn into the first pump 11).

The second coolant temperature sensor 76 is a detector (second heat-medium temperature detector) that detects the temperature of the coolant flowing through the second-pump flow path 42 (for example, the temperature of the coolant drawn into the second pump 12).

The radiator coolant temperature sensor 77 is a detector (device-side heat-medium temperature detector) that detects the temperature of the coolant flowing through the radiator flow path 43 (for example, the temperature of the coolant flowing out of the radiator 13).

The cooler-core temperature sensor 78 is a detector (cooler-core temperature detector) that detects the surface temperature of the cooler core 16. The cooler-core temperature sensor 78 is, for example, a fin thermistor for detecting the temperature of a heat exchange fin in the cooler core 16, a coolant temperature sensor for detecting the temperature of coolant flowing through the cooler core 16, or the like.

The heater-core temperature sensor 79 is a detector (heater-core temperature detector) for detecting the surface temperature of the heater core 17. The heater-core temperature sensor 79 is, for example, a fin thermistor for detecting the temperature of a heat exchange fin in the heater core 17, a coolant temperature sensor for detecting the temperature of the coolant flowing through the heater core 17, or the like.

The engine coolant temperature sensor 80 is a detector (engine heat-medium temperature detector) that detects the temperature of coolant circulating through the engine cooling circuit 60 (for example, the temperature of the coolant flowing through the inside of the engine 61).

The inverter temperature sensor 81 is a detector (device-side heat-medium temperature detector) that detects the temperature of the coolant flowing through the inverter flow path 47 (for example, the temperature of the coolant flowing out of the inverter 19).

The battery temperature sensor 82 is a detector (device-side heat-medium temperature detector) that detects the temperature of the coolant flowing through the battery-heat-exchange flow path 48 (for example, the temperature of the coolant flowing into the battery-temperature adjustment heat exchanger 20).

Refrigerant temperature sensors 83 and 84 are the discharge-side refrigerant temperature sensor 83 that detects the temperature of the refrigerant discharged from the compressor 32, and the suction-side refrigerant temperature sensor 84 that detects the temperature of the refrigerant drawn into the compressor 32.

Refrigerant pressure sensors 85 and 86 are the discharge-side refrigerant pressure sensor 85 that detects the pressure of the refrigerant discharged from the compressor 32, and the suction-side refrigerant pressure sensor 86 that detects the pressure of the refrigerant drawn into the compressor 32.

An operation panel 88 is provided with various air-conditioning operation switches. Operation signals from the operation switches are input to the input side of the controller 70. For example, the operation panel 88 is disposed near the dashboard at the front of the vehicle compartment.

Various types of air-conditioning operation switches provided on the operation panel 88 include an air conditioner switch, an automatic switch, an air volume setting switch for the interior blower 52, a vehicle-interior temperature setting switch, an air-conditioning stop switch, and the like.

The air conditioner switch is a switch for switching between operating and stopping (turning on and off) of air-cooling or dehumidification. The automatic switch is a switch for setting or resetting automatic control of the air-conditioning. The vehicle-interior temperature setting switch is a target temperature setting portion for setting a target vehicle interior temperature by the occupant's operation. The air-conditioning stop switch is a switch that stops the air-conditioning.

Various air-conditioning operation switches provided on the operation panel 88 serve as air-conditioning requesting portions that make a cooling request for the cooler core 16 to cool the ventilation air, as well as a heating request for the heater core 17 to heat the ventilation air.

Next, the operation of the above-mentioned structure will be described. The controller 70 controls the operations of the first pump 11, the second pump 12, the compressor 32, the first switching valve 21, the second switching valve 22, and the like, thereby switching among various operation modes.

For example, a low-temperature side coolant circuit (low-temperature side heat-medium circuit) is formed to allow the coolant drawn into and discharged from the first pump 11 to circulate between the coolant cooler 14 and at least one device of the radiator 13, the cooler core 16, the heater core 17, the coolant-to-coolant heat exchanger 18, the inverter 19, and the battery-temperature adjustment heat exchanger 20. Furthermore, a high-temperature side coolant circuit (high-temperature side heat-medium circuit) is formed to allow the coolant drawn into and discharged from the second pump 12 to circulate between the coolant heater 15 and at least one device of the radiator 13, the cooler core 16, the heater core 17, the coolant-to-coolant heat exchanger 18, the inverter 19, and the battery-temperature adjustment heat exchanger 20.

Each of the radiator 13, the cooler core 16, the heater core 17, the coolant-to-coolant heat exchanger 18, the inverter 19, and the battery-temperature adjustment heat exchanger 20 is switched between a state of connection to the low-temperature side coolant circuit and a state of connection to the high-temperature side coolant circuit, depending on the situation. Thus, the radiator 13, the cooler core 16, the heater core 17, the coolant-to-coolant heat exchanger 18, the inverter 19, and the battery-temperature adjustment heat exchanger 20 can be adjusted to the appropriate temperatures depending on the situation.

When the radiator 13 is connected to the low-temperature side coolant circuit, the refrigeration cycle 31 can perform a heat-pump operation. That is, in the low-temperature side coolant circuit, the coolant cooled by the coolant cooler 14 flows through the radiator 13, allowing the coolant to absorb heat from the outside air at the radiator 13.

Then, the coolant absorbing heat from the outside air at the radiator 13 exchanges heat with the refrigerant in the refrigeration cycle 31 to dissipate heat at the coolant cooler 14. Thus, in the coolant cooler 14, the refrigerant in the refrigeration cycle 31 absorbs heat from outside air via the coolant.

The refrigerant having absorbed heat from the outside air at the coolant cooler 14 exchanges heat with the coolant in the high-temperature side coolant circuit at the coolant heater 15 to thereby dissipate the heat therefrom. Therefore, the heat-pump operation for pumping up the heat from the outside air can be achieved.

When the radiator 13 is connected to the high-temperature side coolant circuit, the coolant heated by the coolant heater 15 flows through the radiator 13, allowing the coolant to dissipate heat into the outside air at the radiator 13.

When the cooler core 16 is connected to the low-temperature side coolant circuit, the coolant cooled by the coolant cooler 14 flows through the cooler core 16, allowing the ventilation air into the vehicle interior to be cooled by the cooler core 16. That is, the vehicle interior can be cooled.

When the heater core 17 is connected to the high-temperature side coolant circuit, the coolant heated by the coolant heater 15 flows through the heater core 17, allowing the ventilation air into the vehicle interior to be heated by the heater core 17. That is, the vehicle interior can be heated.

When the coolant-to-coolant heat exchanger 18 is connected to the low-temperature side coolant circuit, the coolant cooled by the coolant cooler 14 flows through the coolant-to-coolant heat exchanger 18, thereby enabling cooling of the engine coolant. In other words, the coolant in the low-temperature side coolant circuit can absorb heat from the engine coolant at the coolant-to-coolant heat exchanger 18, which can achieve the heat-pump operation that pumps up the waste heat from the engine 61.

When the coolant-to-coolant heat exchanger 18 is connected to the high-temperature side coolant circuit, the coolant heated by the coolant heater 15 flows through the coolant-to-coolant heat exchanger 18, thereby enabling heating of the engine coolant. Thus, the engine 61 can be heated (warmed up).

When the inverter 19 is connected to the low-temperature side coolant circuit, the coolant cooled by the coolant cooler 14 flows through the inverter 19, thereby enabling cooling of the inverter 19. In other words, the heat pump operation of pumping up the waste heat from the inverter 19 can be achieved.

When the inverter 19 is connected to the high-temperature side coolant circuit, the coolant heated by the coolant heater 15 flows through the inverter 19, thereby enabling heating (warming up) of the inverter 19.

When the battery-temperature adjustment heat exchanger 20 is connected to the low-temperature side coolant circuit, the coolant cooled by the coolant cooler 14 flows through the battery-temperature adjustment heat exchanger 20, thereby enabling cooling of the battery. In other words, the heat pump operation of pumping up the waste heat from the battery can be achieved.

When the battery-temperature adjustment heat exchanger 20 is connected to the high-temperature side coolant circuit, the coolant heated by the coolant heater 15 flows through the battery-temperature adjustment heat exchanger 20, thereby enabling heating (warming up) of the battery.

In this embodiment, each of the inner diameter $\phi H$ of the heater-core pipe 45A and the inner diameter $\phi C$ of the cooler-core pipe 44A is smaller than the inner diameter $\phi L$ of each of other coolant pipes 43A, 46A, 47A, and 48A.

With this arrangement, compared to the case in which each of the inner diameter $\phi H$ of the heater-core pipe 45A and the inner diameter $\phi C$ of the cooler-core pipe 44A is the same as the inner diameter $\phi L$ of each of other coolant pipes 43A, 46A, 47A, and 48A, the weights of components included in the coolant pipes between the coolant heater 15 and the heater core 17 and between the coolant cooler 14 and the cooler core 16, as well as the volumes of the coolant therebetween can be decreased, thus reducing the thermal capacity of the air conditioner.

As a result, the amount of heat required to reach the desired coolant temperature can be reduced at the quick air-heating operation (warming-up operation) or the quick air-cooling operation (cooling-down operation) immediately after the start-up of the air-conditioning. With the same cooling-heating capacity per unit time, as the refrigeration cycle 31 has the smaller thermal capacity, the time required for the vehicle interior temperature to reach the target temperature becomes shorter. That is, the warming-up performance and the cooling-down performance are improved, thereby enhancing the comfort of the air-conditioning.

In this embodiment, the inner diameter $\phi H$ of the heater-core pipe 45A is decreased, whereby once the flow rate of the coolant becomes higher, the pressure loss in the pipe is drastically increased. Thus, the amount of heat generated by the pressure loss in the pipe is increased. That is, the pressure loss in the pipe is the loss associated with the viscosity of the coolant, which is caused mainly by a loss due to a friction heat between molecules of the coolant. An increase in pressure loss in the pipe leads to an increase in the amount of generated heat because of the increase in friction heat loss.

Further, when the pressure loss in the pipe is increased, the power consumption by the pump is also increased, resulting in an increase in the amount of heat generated by the driving motor in the pump and a motor-driven element, thus increasing the amount of heat transferred to the coolant.

As a result, the air conditioner can obtain not only the heating capacity of the refrigeration cycle 31, but also a heating capacity produced by the sum of the exhaust heat from electric elements of the pump and the amount of heat generated by the pressure loss in the pipe. Therefore, the air conditioner can further shorten the time required to increase the coolant temperature to the desired temperature at the quick air-heating operation immediately after the start-up of the air-conditioning.

In this embodiment, the controller 70 controls the cooling capacity of the coolant cooler 14 for the coolant (that is, the refrigerant discharge capacity of the compressor 32) such that the temperature of the coolant flowing into the cooler core 16 is at a temperature (e.g., −10° C.) lower than the target temperature TCO (e.g., 1° C.) of the cooler core 16.

Thus, even though the flow rate of the coolant flowing into the cooler core 16 is lessened, the temperature of the cooler core 16 can be maintained at the target temperature TCO, which can suppress an increase in pressure loss in the pipe that would be caused by decreasing the inner diameter $\phi C$ of the cooler-core pipe 44A.

The temperature of the air blown out of the heater core 17 is determined by the volume of ventilation air passing through the heater core 17, and the temperature and flow rate of the coolant flowing through the heater core 17. For example, when the volume of ventilation air passing through the heater core 17 is constant, as the temperature of the coolant flowing through the heater core 17 is increased, the temperature of air blown from the heater core becomes higher, and as the flow rate of the coolant flowing through the heater core 17 is increased, the temperature of air blown from the heater core also becomes higher.

With such a technical feature, even though the flow rate of the coolant flowing through the heater core 17 is decreased, the temperature of air blown from the heater core can be kept constant by increasing the temperature of the coolant flowing through the heater core 17.

By decreasing the flow rate of the coolant flowing through the heater core 17, an increase in pressure loss in the pipe that would be caused by decreasing the inner diameter $\phi H$ of the heater-core pipe 45A can be suppressed. At the normal air-heating operation (except for the quick air-heating operation), the pressure loss in the pipe is desirably lessened to reduce the pump power to a lower level. For this reason, compared to the quick air-heating operation, at the normal air-heating operation, the temperature of the coolant flowing through the heater core 17 is set high, thereby enabling both the improvement of the heating capacity during the quick air-heating and the power saving during the normal air-heating.

On the other hand, the temperature-adjustment target devices, such as the inverter 19 and the battery-temperature adjustment heat exchanger 20, need to maintain the temperature-adjustment target device at the heatproof temperature (e.g., 60° C. in the inverter 19) or lower. Thus, it is not preferable to decrease the flow rate of the coolant flowing through the temperature-adjustment target device.

Taking into consideration these points, this embodiment sets the inner diameter $\phi L$ of each of the inverter pipe 47A and the battery-heat-exchange pipe 48A larger, thereby ensuring the flow rate of the coolant flowing through the temperature-adjustment target device without increasing the pressure loss in the pipe, further maintaining the temperature-adjustment target device at its heatproof temperature or lower.

By increasing its thermal capacity, the rate of rise in the temperature of the inverter and the battery can be suppressed with the increased thermal capacity even when the amount of heat generated at the inverter and the battery is quickly increased. Thus, the air conditioner can improve its protective performance against the heat damage.

Further, the thermal capacity of the cooling pipe 43 for the radiator 13 is increased, so that even when the temperature of air hitting the radiator 13 quickly changes in the heat pump operation mode of absorbing heat from the outside air, the quick change in the amount of absorbed heat can be suppressed to suppress fluctuations in the temperature of conditioned-air blown into the vehicle interior, thereby improving the comfort of the air-conditioning. The expression "when the temperature of air hitting the radiator 13 quickly changes" as used herein means the case where the vehicle travels across spaces with quite different outside-air temperatures, for example, when the vehicle leaves a tunnel during traveling.

The cooler core 16 is a heat exchanger that cools and dehumidifies the ventilation air, which sometimes causes a phenomenon that moisture in the air is condensed on the cooler core 16 to wet its surface. Alternatively, the cooler core 16 exchanges sensible heat between the coolant and the ventilation air. When the flow rate of the coolant becomes small, the temperature distribution could occur on the surface of the cooler core 16. When the temperature of the part of the surface of the cooler core 16 exceeds the dew point due to such characteristics of the cooler core, the condensed water evaporates to cause odor, such as fusty odor, which could make the occupant feel uncomfortable.

Thus, since the cooler core 16 needs to ensure the flow rate of the coolant to some extent, the flow rate of the coolant in the cooler core 16 should be higher than that in the heater core 17.

This is why the inner diameter $\phi C$ of the cooler-core pipe 44A is set larger than the inner diameter $\phi H$ of the heater-core pipe 45A in this embodiment, enabling the suppression of the evaporation of condensed water, thus preventing the generation of odor, such as fusty odor.

Accordingly, in this embodiment, the inner diameter $\phi H$ of the heater-core pipe 45A is set smaller than the inner diameter $\phi C$ of the cooler-core pipe 44A. The inner diameter $\phi H$ of the heater-core pipe 45A can be reduced as much as possible, thereby improving the warming-up performance.

Note that in the normal use range of temperatures, a difference in temperature between the coolant and the ventilation air in the air-heating heat exchanger 17 is set larger than that in temperature between the coolant and the ventilation air in the air-cooling heat exchanger 16. Thus, the inner diameter $\phi H$ of the heater-core pipe 45A is decreased, whereby the degree of reduction in heating performance of the air-heating heat exchanger 17 would be suppressed even though the flow rate of the coolant in the air-heating heat exchanger 17 is decreased.

For example, in the dehumidification and air-heating mode at the vehicle interior air temperature of 25° C., the cooler core 16 draws the air at 25° C., and allows the coolant at 0° C. to flow therethrough, thus blowing out the air at 1° C., whereas the heater core 17 draws the air at 1° C., and reheats the air with the coolant at 53° C., thus blowing out the air at 50° C.

In this case, an air-coolant temperature difference (a difference in temperature between the air and coolant) in the heater core 17 is about 52° C., while an air-coolant temperature difference in the cooler core 16 is about 25° C. When the flow rate of the coolant in the heater core was the same as that in the cooler core, the amount of heat transfer at the heater core 17 with the larger air-coolant temperature difference becomes more, which can decrease the flow rate of the heater core 17.

In this embodiment, the first switching valve 21 and the second switching valve 22 are adapted to switch between a circulation state in which the coolant circulates and a non-circulation state in which the coolant does not circulate, between the cooler core 16 and the radiator 13, coolant-to-coolant heat exchanger 18, inverter 19, and battery-temperature adjustment heat exchanger 20. The controller 70 controls the first switching valve 21 and the second switching valve 22 to switch to the non-circulation state at the cooling-down operation (at the start-up of air-conditioning).

With this arrangement, at the cooling-down operation, the thermal capacities of the radiator 13, coolant-to-coolant heat exchanger 18, inverter 19, and battery-temperature adjustment heat exchanger 20 can be reduced in the low-temperature side coolant circuit having the coolant cooler 14 and the cooler core 16, thereby further improving the cooling-down performance.

Likewise, in this embodiment, the first switching valve 21 and the second switching valve 22 are adapted to switch between a circulation state in which the coolant circulates and a non-circulation state in which the coolant does not circulate, between the heater core 17 and the radiator 13, coolant-to-coolant heat exchanger 18, inverter 19, and battery-temperature adjustment heat exchanger 20. The controller 70 controls the first switching valve 21 and the second switching valve 22 to switch to the non-circulation state at the warming-up operation (at the start-up of air-conditioning).

With this arrangement, in the warming-up operation, the thermal capacities of the radiator 13, coolant-to-coolant heat exchanger 18, inverter 19, and battery-temperature adjustment heat exchanger 20 can be reduced in the high-temperature side coolant circuit having the coolant heater 15 and the heater core 17, thereby further improving the warming-up performance.

Second Embodiment

Figure 4:
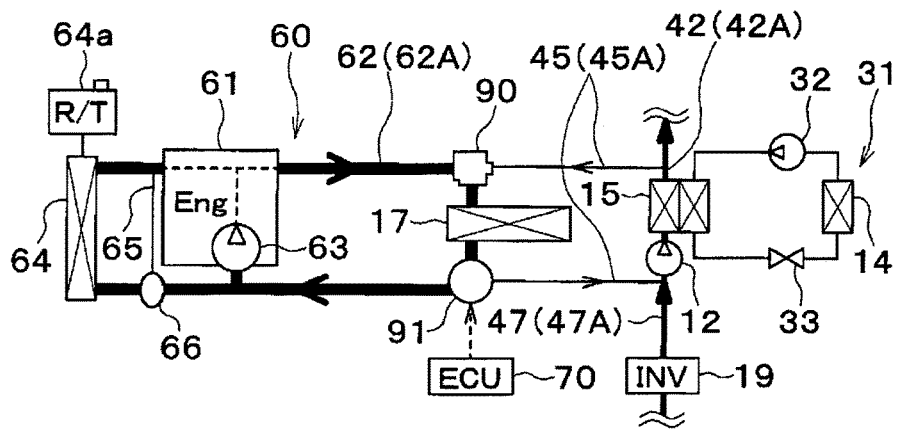
FIG. 4 is an entire configuration diagram of a vehicle thermal management system according to a second embodiment.

In this embodiment, as shown in FIG. 4, the heater core 17 is disposed in the circulation flow path 62 of the engine cooling circuit 60.

The heater-core flow path 45 is coupled to the coolant outlet side of the coolant heater 15 and the coolant suction side of the second pump 12 in the second-pump flow path 42.

The heater-core flow path 45 is coupled to the coolant outlet side of the engine 61 and the coolant inlet side of the heater core 17 in the circulation flow path 62 via a three-way joint 90.

The heater-core flow path 45 is coupled to the coolant outlet side of the heater core 17 and the coolant inlet side of the engine 61 in the circulation flow path 62 via a three-way valve 91.

The three-way valve 91 is a switching device that switches between the state in which the coolant heated by the engine 61 flows through the heater core 17 and the state in which the coolant heated by the coolant heater 15 flows through the heater core 17. The operation of the three-way valve 91 is controlled by the controller 70.

The diameter $\phi H$ of the heater-core flow path 45 is set smaller than the diameter $\phi L$ of the circulation flow path 62. In other words, the inner diameter $\phi H$ of the heater-core pipe 45A forming the heater-core flow path 45 is set smaller than the inner diameter $\phi L$ of a circulation pipe 62A forming the circulation flow path 62. That is, the heater-core pipe 45A is the small-inner-diameter pipe, while the circulation pipe 62A is the large-inner-diameter pipe.

This embodiment can exhibit the same functions and effects as those in the first embodiment.

Third Embodiment

Figure 5:
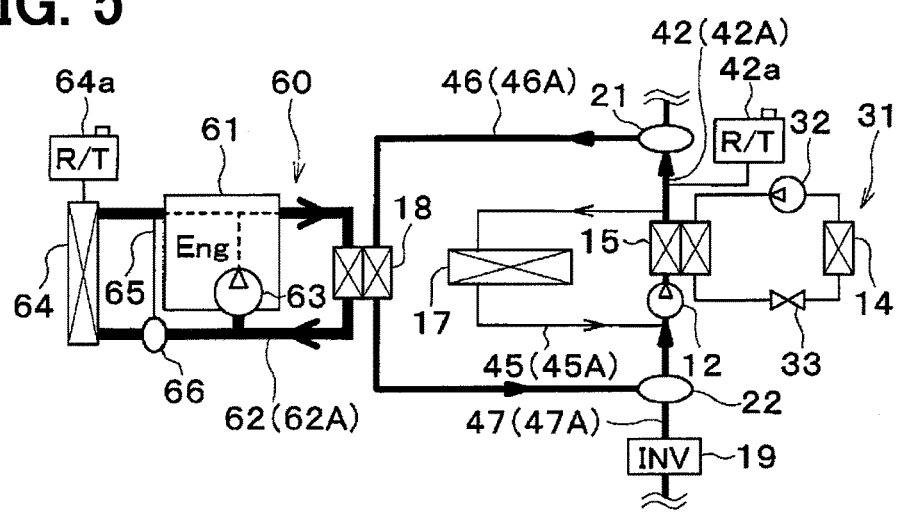
FIG. 5 is an entire configuration diagram of a vehicle thermal management system according to a third embodiment.

In this embodiment, as shown in FIG. 5, one end of the heater-core flow path 45 is coupled to the coolant outlet side of the coolant heater 15 in the second-pump flow path 42, while the other end of the heater-core flow path 45 is coupled to the coolant suction side of the second pump 12 in the second-pump flow path 42.

A reserve tank 42a is coupled to the second-pump flow path 42. The structure and function of the reserve tank 42a are substantially the same as those of the above-mentioned reserve tank 43a.

The diameter φH of the heater-core flow path 45 is set smaller than the diameter φL of each of the second-pump flow path 42 and the coolant-to-coolant heat exchanger flow path 46. In other words, the inner diameter φH of the heater-core pipe 45A forming the heater-core flow path 45 is set smaller than the inner diameter φL of each of a second-pump pipe 42A forming the second-pump flow path 42 and the coolant-to-coolant heat exchanger pipe 46A forming the coolant-to-coolant heat exchanger flow path 46.

That is, the heater-core pipe 45A is the small-inner-diameter pipe, while the second-pump pipe 42A and the coolant-to-coolant heat exchanger pipe 46A are the large-inner-diameter pipes.

This embodiment can exhibit the same functions and effects as those in the first embodiment.

Fourth Embodiment

Figure 6:
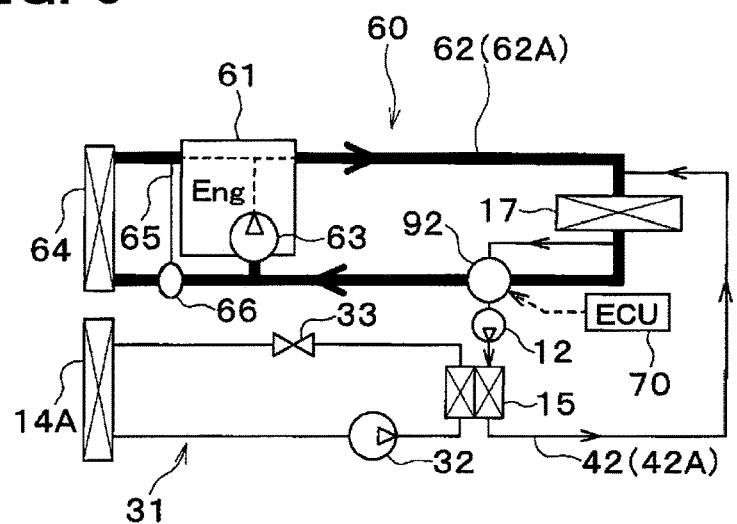
FIG. 6 is an entire configuration diagram of a vehicle thermal management system according to a fourth embodiment.

In this embodiment, as shown in FIG. 6, the heater core 17 is disposed in the circulation flow path 62 of the engine cooling circuit 60.

One end of the second-pump flow path 42 is coupled to the coolant outlet side of the engine 61 and the coolant inlet side of the heater core 17 in the circulation flow path 62.

The other end of the second-pump flow path 42 is coupled to the coolant outlet side of the heater core 17 and the coolant inlet side of the engine 61 in the circulation flow path 62.

A four-way valve 92 is disposed at a part of the circulation flow path 62 located on the coolant inlet side of the engine 61 with respect to the other connection part of the second-pump flow path 42 to the circulation flow path 62. The four-way valve 92 is coupled to the part of the coolant suction side of the second pump 12 in the second-pump flow path 42.

Figure 7:
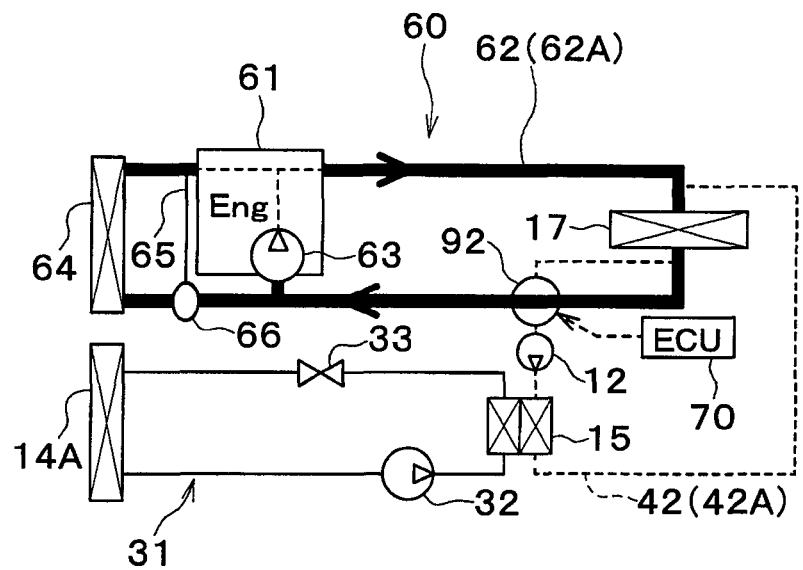
FIG. 7 is an entire configuration diagram showing a first state of the vehicle thermal management system in the fourth embodiment.
Figure 8:
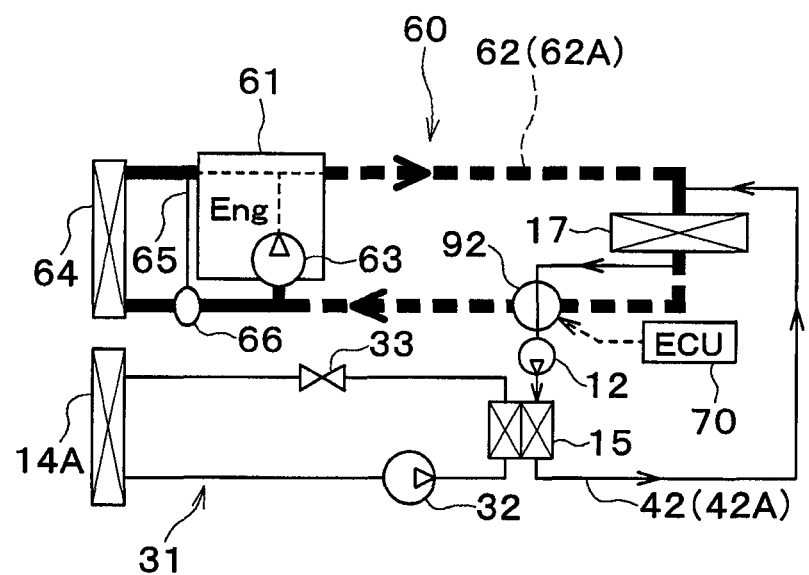
FIG. 8 is an entire configuration diagram showing a second state of the vehicle thermal management system in the fourth embodiment.

The four-way valve 92 is a flow-path switching device that switches between a first state shown in FIG. 7 and a second state shown in FIG. 8. The first state shown in FIG. 7 is a state in which the coolant flows through the circulation flow path 62 but does not flow through the second-pump flow path 42. The second state shown in FIG. 8 is a state in which the coolant does not flow through the circulation flow path 62 but flows through the second-pump flow path 42. The operation of the four-way valve 92 is controlled by the controller 70.

The diameter φH of the second-pump flow path 42 is set smaller than the diameter φL of the circulation flow path 62. In other words, the inner diameter φH of the second-pump pipe 42A forming the second-pump flow path 42 is set smaller than the inner diameter φL of the circulation pipe 62A forming the circulation flow path 62.

That is, the second-pump pipe 42A is the small-inner-diameter pipe, while the circulation pipe 62A is the large-inner-diameter pipe.

The refrigeration cycle 31 is provided with an evaporator 14A that evaporates (changes latent heat of) a low-pressure side refrigerant by exchanging heat between the low-pressure side refrigerant decompressed and expanded by the expansion valve 33 and the ventilation air into the vehicle interior.

When the air-conditioning mode is an engine-heat air-heating mode, the air conditioner is switched to the first state shown in FIG. 7. The engine-heat air-heating mode is an air-conditioning mode that is performed during the normal operation of the engine 61. In the engine-heat air-heating mode, the waste heat from the engine 61 is used to heat the ventilation air at the heater core 17.

In the engine-heat air-heating mode, the coolant circulates through the circulation flow path 62 with the larger diameter between the engine 61 and the heater core 17. Even when the output from the engine pump 63 is low, a sufficient amount of the coolant is allowed to circulate through the heater core 17.

When the air-conditioning mode is a heat-pump air-heating mode, the air conditioner is switched to the second state shown in FIG. 8. The heat-pump air-heating mode is an air-conditioning mode that is performed during the warming-up operation of the engine 61. In the heat-pump air-heating mode, the heating capacity of the refrigeration cycle 31 is used to heat the ventilation air at the heater core 17.

In the heat-pump air-heating mode, the air-heating is performed by the heat pump operation that involves absorbing heat from the outside air without taking heat from the engine 61. Thus, the temperature of the engine coolant can be quickly raised, thereby improving the fuel efficiency and also ensuring the air-heating performance even while the engine 61 is being warmed up.

In the heat-pump air-heating mode, the coolant circulates between the coolant heater 15 and the heater core 17 through the second-pump flow path 42 with the smaller diameter, thereby enabling the reduction of the thermal capacity, quickly increasing the blowing temperature of the heater core.

In this embodiment, the four-way valve 92 switches between the first state shown in FIG. 7 and the second state shown in FIG. 8. In this way, the circulation pipe 62A with the larger inner diameter and the second-pump pipe 42A with the smaller inner diameter can be used individually.

In the first state, the circulation pipe 62A with the larger inner diameter can be used to reduce the power consumption by the pump to enhance the air-conditioning efficiency. In the second state, the second-pump pipe 42A with the smaller inner diameter can be used to reduce the thermal capacity, thus shortening the time required for the coolant temperature to reach the desired temperature.

For example, regarding a pipe with 1.5 m length, 16 mm inner diameter and 24 mm outer diameter, its internal capacity for the coolant is 300 cc, and its volume is 377 cc. In contrast, regarding a hose pipe with 1.5 m length, 8 mm inner diameter, and 16 mm outer diameter, its internal capacity for the coolant is 75.4 cc, and its volume is 300.7 cc.

Thus, the inner diameter of the pipe with 1.5 m in length is changed from 16 mm to 8 mm, so that the capacity for the coolant can be reduced by 225 cc, and the volume of the pipe can be reduced by 76 cc. In this way, for example, when the coolant is a 50% ethylene glycol solution, and the material for the pipe is ethylene-propylene-diene copolymer rubber (EPDM), the thermal capacity can be reduced by 965 J/K. Note that the 50% ethylene glycol solution has a specific heat of 3.5 J/g·K and a specific weight of 1.05. On the other hand, the ethylene-propylene-diene copolymer rubber (EPDM) has a specific heat of 2.2 J/g·K and a specific weight of 0.87.

For example, when the heating capacity of the coolant heater 15 is 3 kW, the thermal capacity is reduced by 965 J/K, which can shorten the time required for the coolant temperature to increase from −10° C. to 60° C., by about 34 seconds.

Figures 9, 10, 11:
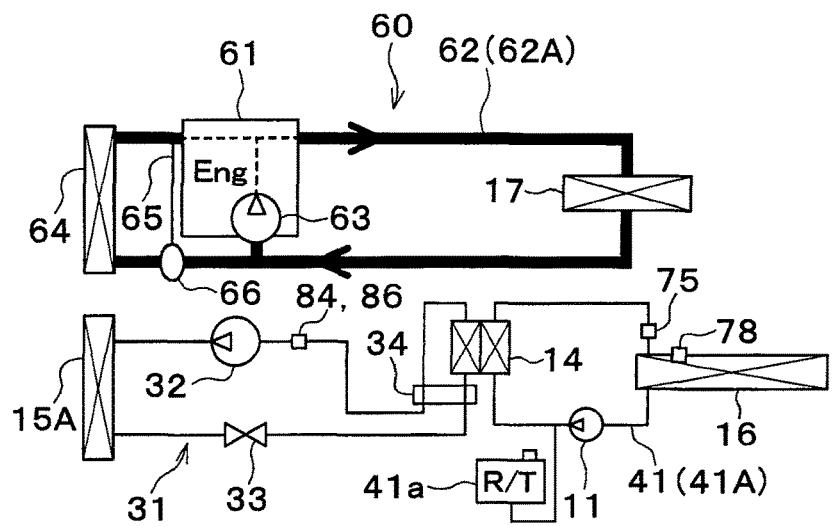
FIG. 9 is a table showing estimated values of pressure losses and pump power consumption in a pipe having an inner diameter of 16 mm and a length of 3 m.
FIG. 10 is a table showing estimated values of pressure losses and pump power consumption in a pipe having an inner diameter of 8 mm and a length of 3 m.
FIG. 11 is an entire configuration diagram of a vehicle thermal management system according to a fifth embodiment.

FIG. 9 is a table showing estimated values of pressure losses and pump power consumption in pipe having an inner diameter of 16 mm and a length of 3 m. FIG. 10 is a table showing estimated values of pressure losses and pump power consumption in pipe having an inner diameter of 8 mm and a length of 3 m. FIGS. 9 and 10 show the calculated values of the pressure loss and the pump power consumption in the pipes on the condition in which the coolant temperature is 20° C. and the total efficiency of the pump is 30%.

As can be seen from the comparison between FIGS. 9 and 10, the pipe with the inner diameter of 16 mm can reduce the pump power consumption to about ⅟25 of that in the pipe with the inner diameter of 8 mm.

Thus, during the steady-air-conditioning time, the air conditioner is switched to the first state in which the circulation pipe 62A with the larger inner diameter is used, whereby the pump power consumption can be reduced to enhance the air-conditioning efficiency. In contrast, during the quick air-conditioning time immediately after the start-up of the air-conditioning, the air conditioner is switched to the second state in which the second-pump pipe 42A with the smaller inner diameter is used, whereby the temperature of the coolant can quickly reach the desired temperature.

Fifth Embodiment

In this embodiment, as shown in FIG. 11, the heater core 17 is disposed in the circulation flow path 62 of the engine cooling circuit 60, and the cooler core 16 is disposed in the first-pump flow path 41.

The refrigeration cycle 31 is provided with a condenser 15A that condenses (changes latent heat of) a high-pressure side refrigerant by exchanging heat between the high-pressure side refrigerant discharged from the compressor 32 and the outside air.

A reserve tank 41a is coupled to the first-pump flow path 41. The structure and function of the reserve tank 41a are substantially the same as those of the above-mentioned reserve tank 43a.

The diameter φC of the first-pump flow path 41 is set smaller than the diameter φL of the circulation flow path 62. In other words, the inner diameter φC of a first-pump pipe 41A (cooling side pipe) forming the first pump flow path 41 is set smaller than the inner diameter φL of the circulation pipe 62A (heating side pipe) forming the circulation flow path 62. That is, the first-pump pipe 41A is the small-inner-diameter pipe, while the circulation pipe 62A is the large-inner-diameter pipe.

Thus, the volume of the coolant and the capacity of the coolant pipe in the low-temperature side coolant circuit including the coolant cooler 14 and the cooler core 16 can be reduced to decrease the thermal capacity, thereby improving the cooling-down performance.

In the high-temperature side coolant circuit including the heater core 17 and the engine 61, the waste heat from the engine 61 is used, and thus the influence of the thermal capacity is very small. Thus, the diameter φL of the circulation flow path 62 can be increased to ensure the adequate flow rate of the coolant flowing through the heater core 17.

In this embodiment, like the first embodiment mentioned above, the controller 70 controls the cooling capacity of the coolant cooler 14 (that is, the refrigerant discharge capacity of the compressor 32) such that the temperature of the coolant flowing into the cooler core 16 is at a temperature (e.g., −10° C.) lower than the target temperature TCO (e.g., 1° C.) of the cooler core 16.

Thus, even though the flow rate of the coolant flowing into the cooler core 16 is lessened, the temperature of the cooler core 16 can be maintained at the target temperature TCO, which can suppress an increase in pressure loss in the pipe that would be caused by decreasing the inner diameter φC of the cooler-core pipe 44A.

Sixth Embodiment

Figure 12:
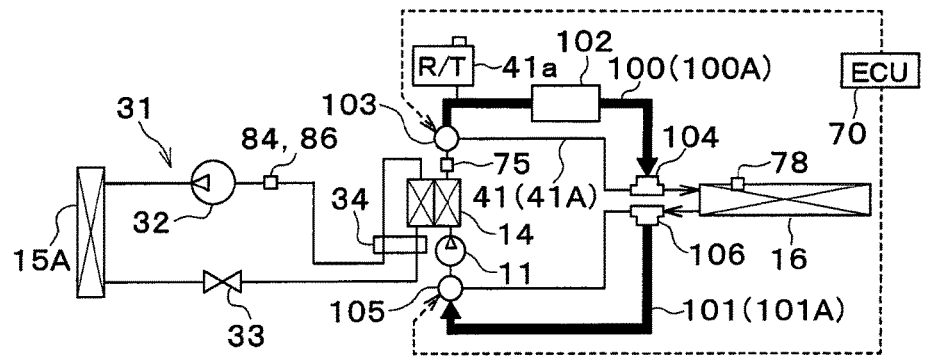
FIG. 12 is an entire configuration diagram of a vehicle thermal management system according to a sixth embodiment.

In this embodiment, as shown in FIG. 12, the cooler core 16 is disposed in the first-pump flow path 41. To the first-pump flow path 41, a first parallel flow path 100 and a second parallel flow path 101 are connected.

A cold storage portion 102 is provided in the first parallel flow path 100. The cold storage portion 102 stores cold heat contained in the coolant flowing through the first parallel flow path 100. Examples of the cold storage portion 102 can include a chemical heat-storage material, a thermal insulation tank, and a latent-heat type heat storage member (paraffin or hydrate material). The thermal insulation tank may be formed by locally enlarging the diameter of the first parallel flow path 100.

One end of the first parallel flow path 100 is coupled to the coolant outlet side of the coolant cooler 14 in the first-pump flow path 41 via a first three-way valve 103. The other end of the first parallel flow path 100 is coupled to the coolant inlet side of the cooler core 16 in the first-pump flow path 41 via a first three-way joint 104.

One end of the second parallel flow path 101 is coupled to the coolant suction side of the first pump 11 in the first-pump flow path 41 via a second three-way valve 105. The other end of the second parallel flow path 101 for a cold-storage device is coupled to the coolant outlet side of the cooler core 16 in the first-pump flow path 41 via a second three-way joint 106.

The first three-way valve 103 is the flow-path switching device that switches between a first state of allowing the coolant flowing out of the coolant cooler 14 to flow through the first parallel flow path 100 and a second state of allowing the coolant flowing out of the coolant cooler 14 to flow through the first-pump flow path 41 without flowing through the first parallel flow path 100.

The second three-way valve 105 is the flow-path switching device that switches between a first state of allowing the coolant flowing out of the cooler core 16 to flow through the second parallel flow path 101 and a second state of allowing the coolant flowing out of the cooler core 16 to flow through the first-pump flow path 41 without flowing through the second parallel flow path 101.

The refrigeration cycle 31 is provided with the condenser 15A that condenses (changes latent heat of) a high-pressure side refrigerant by exchanging heat between the high-pressure side refrigerant discharged from the compressor 32 and the outside air.

The reserve tank 41a is coupled to the first-pump flow path 41. The structure and function of the reserve tank 41a are substantially the same as those of the above-mentioned reserve tank 43a.

The diameter φC of the first-pump flow path 41 is set smaller than the diameter φL of each of the first parallel flow path 100 and the second parallel flow path 101. In other words, the inner diameter φC of the first-pump pipe 41A forming the first-pump flow path 41 is set smaller than the inner diameter φL of each of the parallel pipes 100A and 101A forming the first parallel flow path 100 and the second parallel flow path 101, respectively. Thus, the first-pump pipe 41A is the small-inner-diameter pipe.

The first parallel flow path 100 and the second parallel flow path 101 are disposed in parallel with part of the first-pump flow path 41. In other word, the parallel pipes 100A and 101A are disposed in parallel with the part of the first-pump pipe 41A.

In the normal air-cooling operation, the controller 70 controls the operations of the first three-way valve 103 and the second three-way valve 105 to switch to the above-mentioned first state. In this way, the coolant circulates between the coolant cooler 14 and the cooler core 16 through the first parallel flow path 100 and the second parallel flow path 101, which have the large diameters.

Upon the quick air-cooling operation immediately after the start-up of air-conditioning, the controller 70 controls the operations of the first three-way valve 103 and the second three-way valve 105 to switch to the above-mentioned second state. In this way, the coolant circulates between the coolant cooler 14 and the cooler core 16 through the first-pump flow path 41, which has the small diameter.

For example, the controller 70 determines that the air conditioner is in the state of the quick air-cooling operation immediately after the start-up of the air-conditioning when an absolute value of a difference between a target temperature TCO of the cooler core 16 and an actual temperature TC of the cooler core 16 exceeds a predetermined value.

For example, the controller 70 may determine that the air conditioner is in the state of the quick air-cooling operation immediately after the start-up of the air-conditioning when an absolute value of a difference between a temperature associated with the target temperature TCO of the cooler core 16 and a temperature associated with the actual temperature TC of the cooler core 16 exceeds the predetermined value.

Further, for example, the controller 70 may determine that the air conditioner is in the state of the quick air-cooling operation immediately after the start-up of the air-conditioning when the operation of the blower 54 is started.

In this way, the first-pump flow path 41 with the smaller diameter and the parallel flow paths 100 and 101 with the larger diameters are independently used, whereby the coolant temperature can be quickly decreased to the desired temperature at the quick air-cooling operation immediately after the start-up of the air-conditioning, and the air-cooling efficiency can be enhanced at the steady-air-heating operation. The reason for this is the same as that in the above-mentioned fourth embodiment.

Seventh Embodiment

Figure 13:
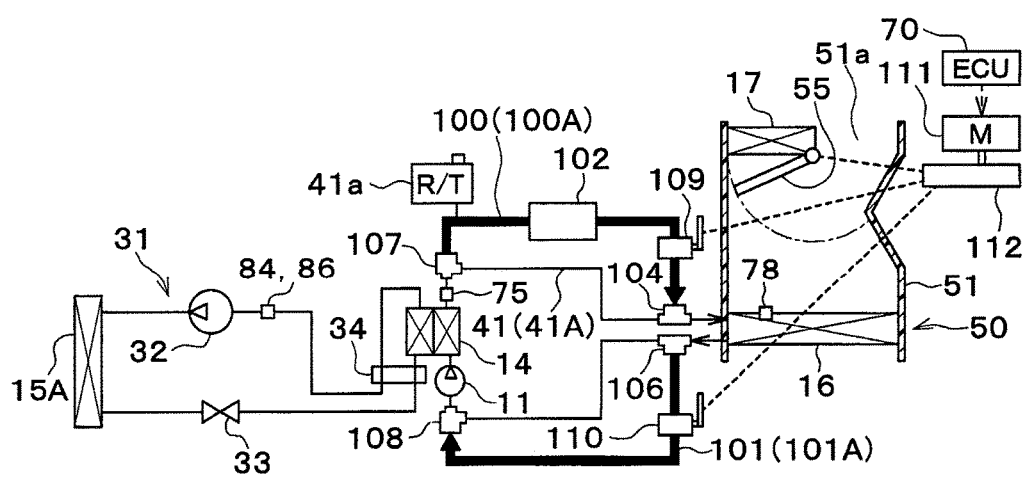
FIG. 13 is an entire configuration diagram of a vehicle thermal management system according to a seventh embodiment.

In this embodiment, as shown in FIG. 13, three-way joints 107 and 108 are disposed instead of the first three-way valve 103 and the second three-way valve 105 in the above-mentioned sixth embodiment, a first flow-path on-off valve 109 is disposed in the first parallel flow path 100, and a second flow-path on-off valve 110 is disposed in the second parallel flow path 101.

The first flow-path on-off valve 109 opens and closes the first parallel flow path 100 to thereby connect and disconnect the circulation of the coolant in the first parallel flow path 100. The second flow-path on-off valve 110 opens and closes the second parallel flow path 101 to thereby connect and disconnect the circulation of the coolant in the second parallel flow path 101.

The first flow-path on-off valve 109 and the second flow-path on-off valve 110 are driven by an electric actuator 111 for driving the air mix door 55 via a link-gear mechanism 112. The operation of the electric actuator 111 is controlled by the controller 70.

In a maximum air-cooling state (MAXCOOL mode) of allowing the air mix door 55 to fully open the heater-core bypass passage 51a and to completely close the air passage on the heater core 17 side, the first flow-path on-off valve 109 and the second flow-path on-off valve 110 are driven to completely close the first parallel flow path 100 and the second parallel flow path 101. Thus, the coolant circulates between the coolant cooler 14 and the cooler core 16 through the first-pump flow path 41 with the small diameter, thus enabling quick reduction in the coolant temperature to the desired temperature.

In any mode other than the maximum air-cooling state (MAXCOOL mode) of the air mix door 55, the first flow-path on-off valve 109 and the second flow-path on-off valve 110 are driven to open the first parallel flow path 100 and the second parallel flow path 101. In this way, the coolant circulates between the coolant cooler 14 and the cooler core 16 through the first parallel flow path 100 and the second parallel flow path 101, which have the large diameters, thereby enabling the improvement of the air-cooling efficiency during the steady-air-cooling operation.

Eighth Embodiment

Figure 14:
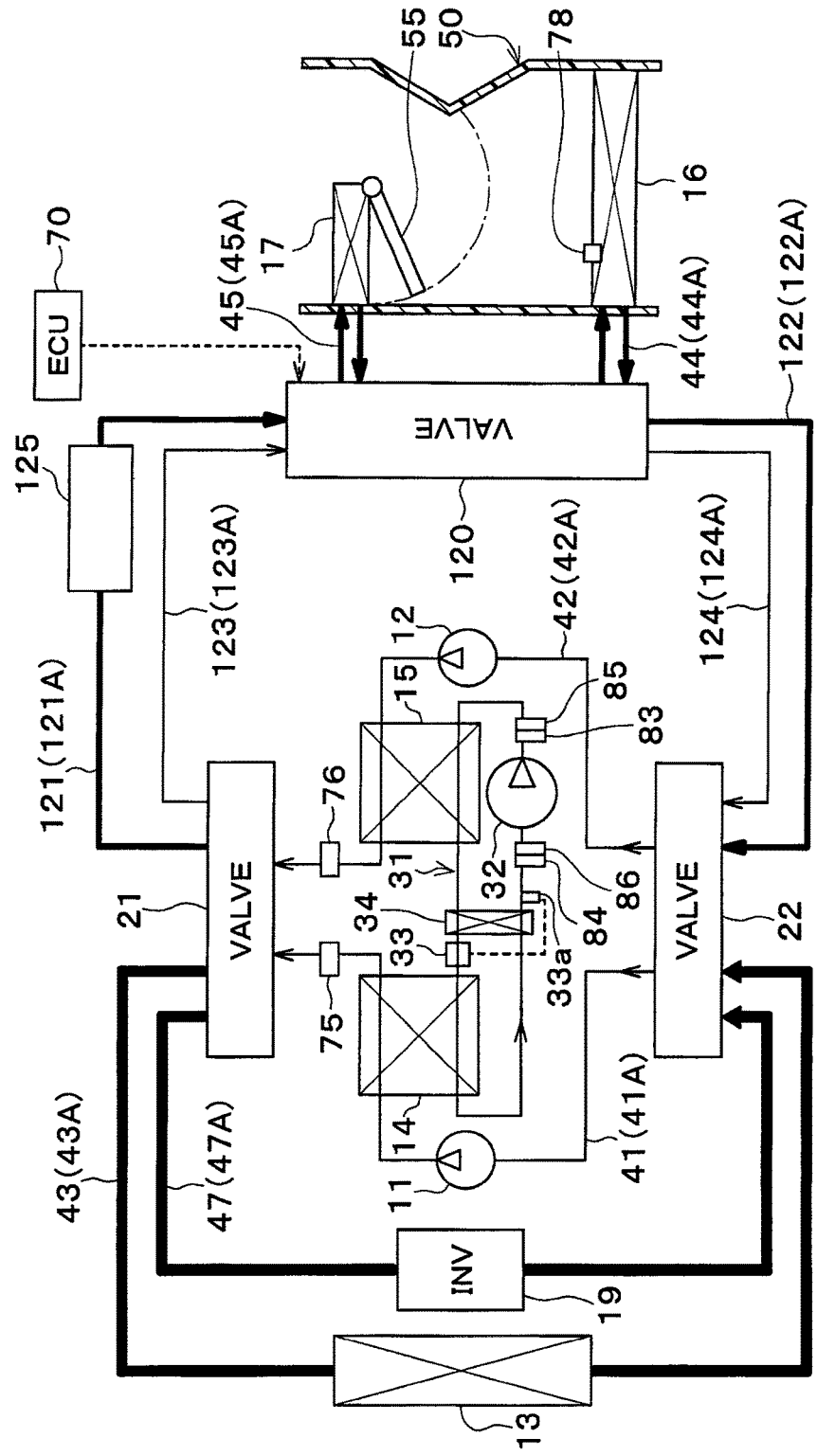
FIG. 14 is an entire configuration diagram of a vehicle thermal management system according to an eighth embodiment.

In this embodiment, as shown in FIG. 14, both ends of the cooler-core flow path 44 and both ends of the heater-core flow path 45 are coupled to a flow-path switching valve 120.

The flow-path switching valve 120 is coupled to one end of a first large-diameter flow path 121, one end of a second large-diameter flow path 122, one end of a first small-diameter flow path 123, and one end of a second small-diameter flow path 124.

The other end of the first large-diameter flow path 121 and the other end of the first small-diameter flow path 123 are coupled to the coolant outlet side of the first switching valve 21. The other end of the second large-diameter flow path 122 and the other end of the second small-diameter flow path 124 are coupled to the coolant inlet side of the second switching valve 22.

Specifically, the first switching valve 21 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to each of the first large-diameter flow path 121 and the first small-diameter flow path 123.

Specifically, the second switching valve 22 switches among a state in which the coolant flows out to the first pump 11, a state in which the coolant flows out to the second pump 12, and a state in which the coolant flows out to neither the first pump 11 nor the second pump 12, with respect to each of the second large-diameter flow path 122 and the second small-diameter flow path 124.

The flow-path switching valve 120 is a flow-path switching device that switches between a state in which the heater-core flow path 45 is coupled to the first and second large-diameter flow paths 121 and 122, and the cooler-core flow path 44 is coupled to the first and second small-diameter flow paths 123 and 124, and a state in which the heater-core flow path 45 is coupled to the first and second small-diameter flow paths 123 and 124, and the cooler-core flow path 44 is coupled to the first and second large-diameter flow paths 121 and 122.

The operation of the flow-path switching valve 120 is controlled by the controller 70. That is, the controller 70 serves as a flow-path switching control unit that controls the operation of the flow-path switching valve 120.

The diameter $\phi S$ of each of the first small-diameter flow path 123 and the second small-diameter flow path 124 is set smaller than the diameter $\phi L$ of each of the first large-diameter flow path 121 and the second large-diameter flow path 122. In other words, the inner diameter $\phi S$ of each of the small-inner-diameter pipes 123A and 124A forming the first small-diameter flow path 123 and the second small-diameter flow path 124, respectively, is set smaller than the inner diameter $\phi L$ of each of the large-inner-diameter pipes 121A and 122A forming the first large-diameter flow path 121 and the second large-diameter flow path 122, respectively.

The large-inner-diameter pipes 121A and 122A are disposed in parallel with the small-inner-diameter pipes 123A and 124A, respectively. That is, the large-inner-diameter pipes 121A and 122A are parallel pipes.

A cold-heat storage portion 125 is provided in the first large-diameter flow path 121. The cold-heat storage portion 125 stores therein hot heat or cold heat contained in the coolant. Examples of the cold-heat storage portion 125 can include a chemical heat-storage material, a thermal insulation tank, and a latent-heat type heat storage member (paraffin or hydrate material). The thermal insulation tank may be formed by locally enlarging the diameter of the first large-diameter flow path 121.

Figure 15:
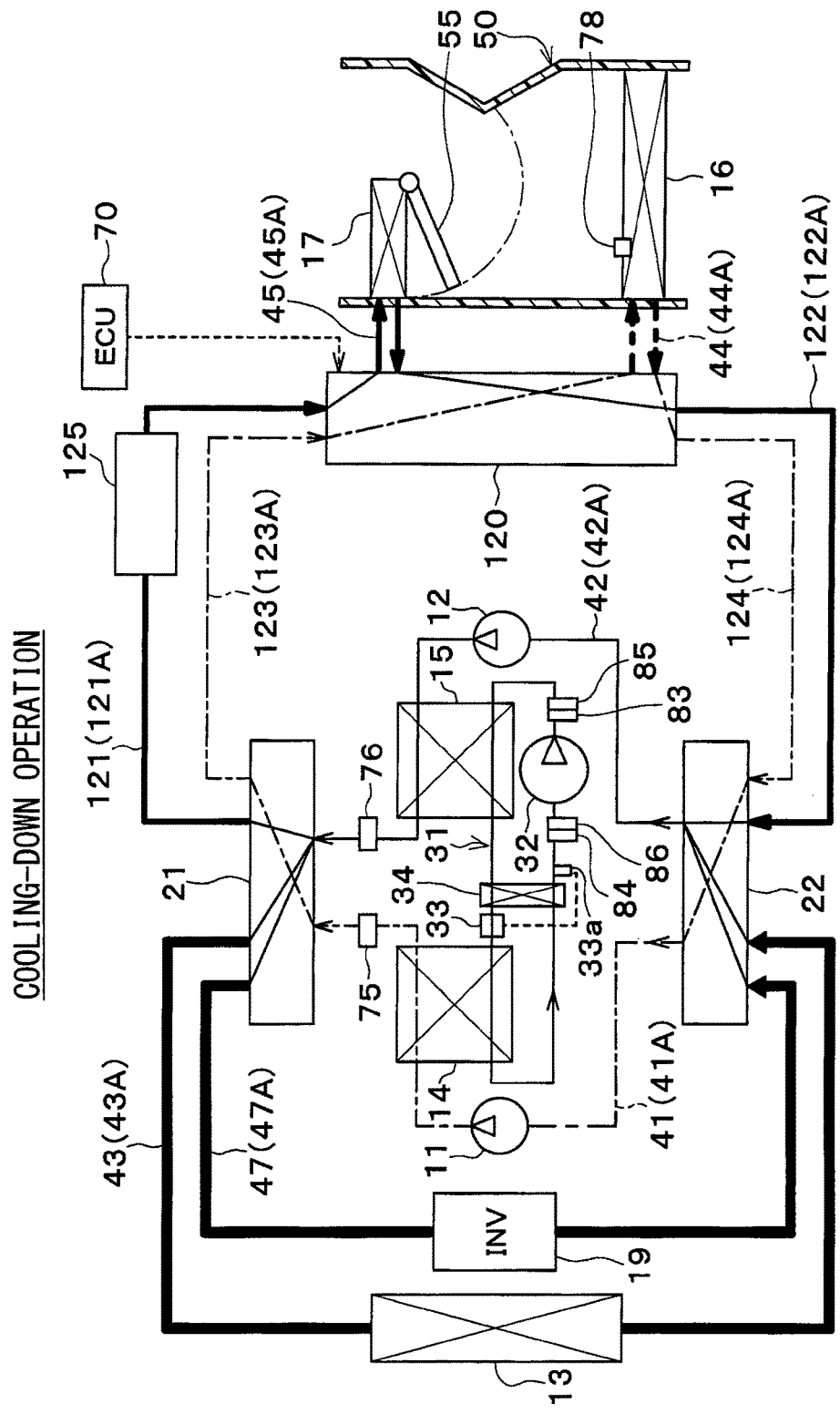
FIG. 15 is an entire configuration diagram showing a cooling-down operation of the vehicle thermal management system in the eighth embodiment.

During the cooling-down operation, as shown in FIG. 15, the controller 70 controls the operation of the flow-path switching valve 120 such that the coolant circulates between the coolant cooler 14 and the cooler core 16 through the first small-diameter flow path 123 and the second small-diameter flow path 124, which have the small diameters (in a second state).

Figure 16:
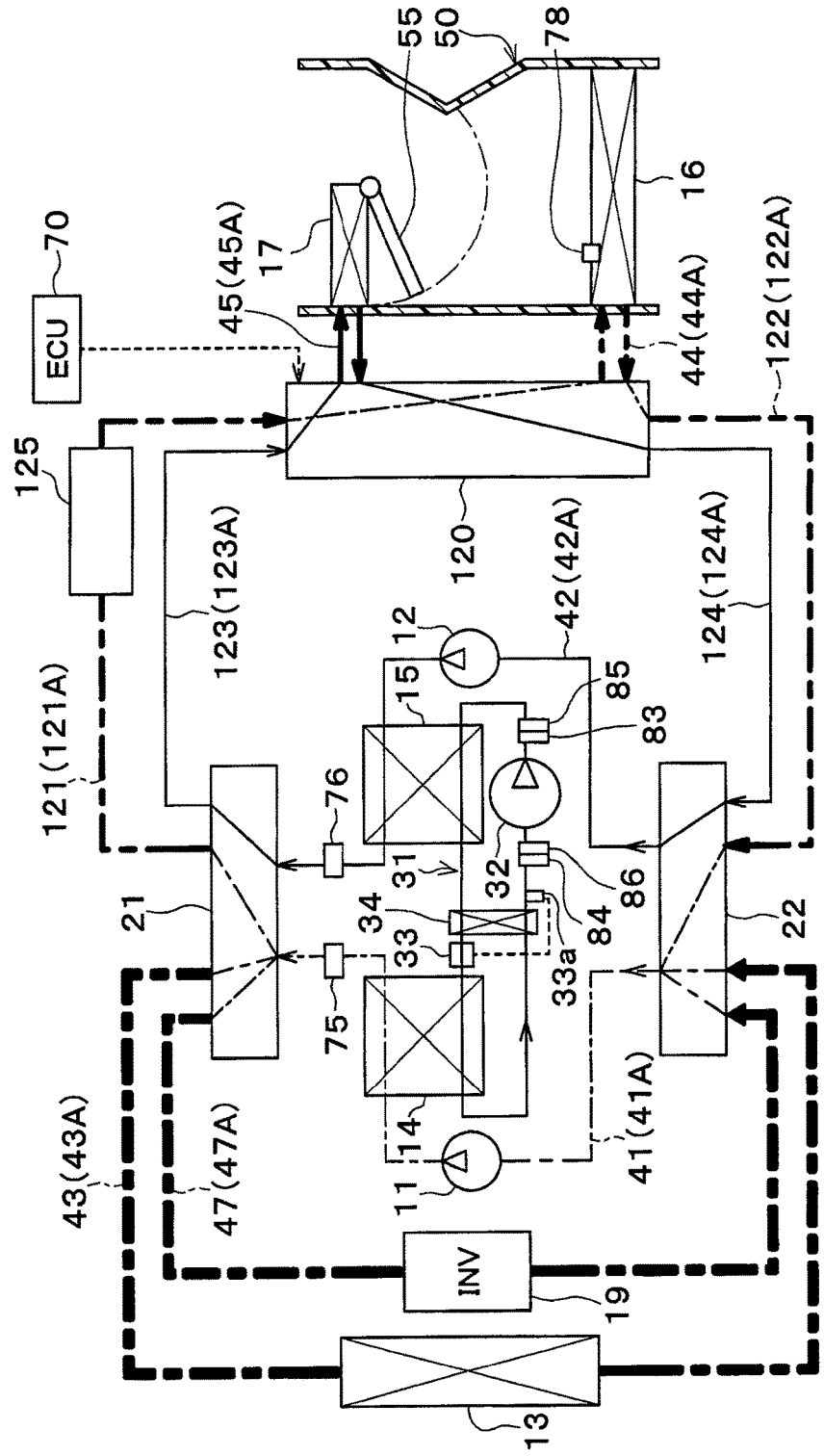
FIG. 16 is an entire configuration diagram showing a warming-up operation of the vehicle thermal management system in the eighth embodiment.

During the warming-up operation, as shown in FIG. 16, the controller 70 controls the operation of the flow-path switching valve 120 such that the coolant circulates between the coolant heater 15 and the heater core 17 through the first small-diameter flow path 123 and the second small-diameter flow path 124, which have the small diameters (in a second state).

Figure 17:
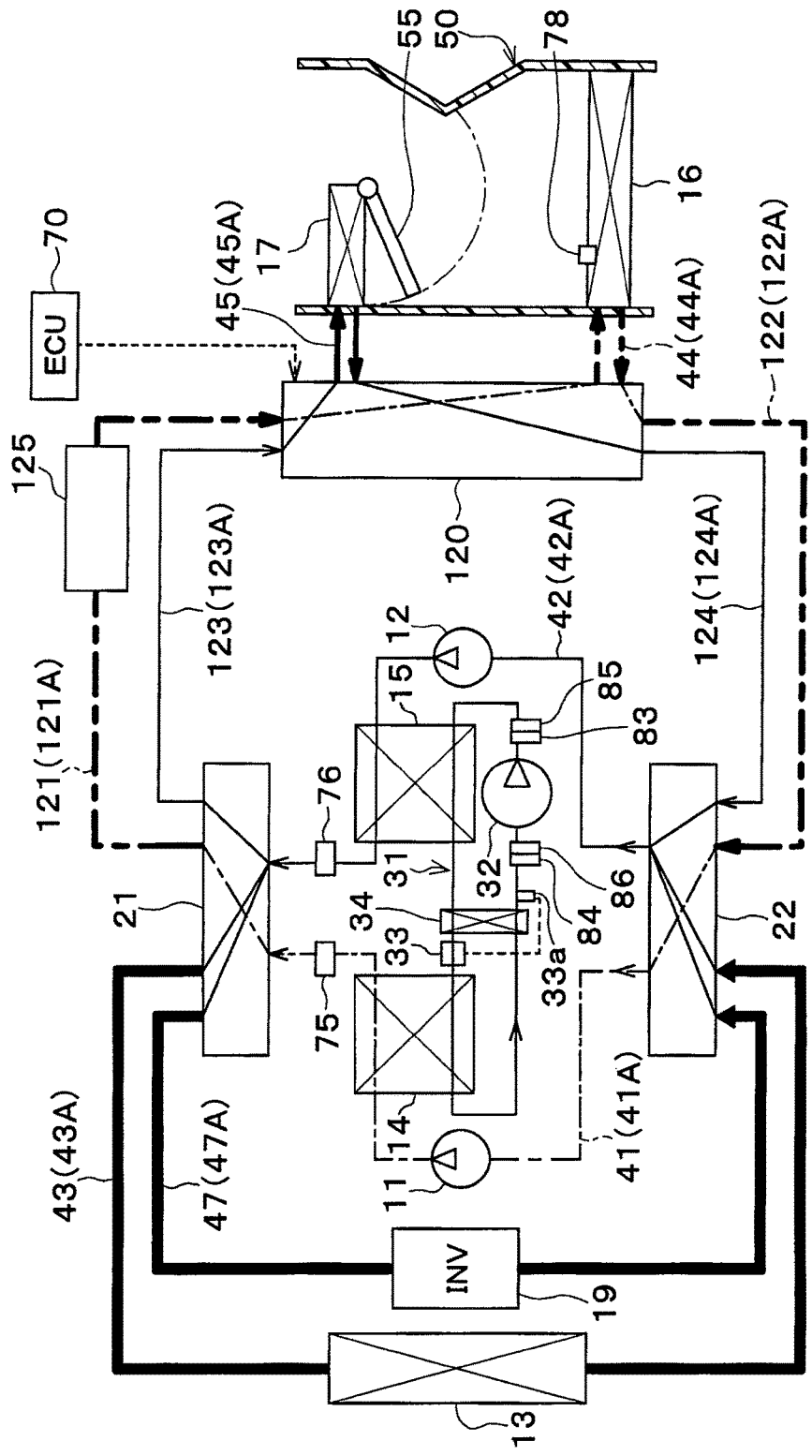
FIG. 17 is an entire configuration diagram showing a normal air-cooling operation of the vehicle thermal management system in the eighth embodiment.

During the normal air-cooling operation, as shown in FIG. 17, the controller 70 controls the operation of the flow-path switching valve 120 such that the coolant circulates between the coolant cooler 14 and the cooler core 16 through the first large-diameter flow path 121 and the second large-diameter flow path 122, which have the large diameters (in a first state).

During the normal air-cooling operation, the controller 70 may control the operation of the flow-path switching valve 120 such that the coolant circulates between the coolant heater 15 and the heater core 17 through the first small-diameter flow path 123 and the second small-diameter flow path 124, which have the small diameters. That is, at the air-cooling operation, the load on the cooler core 16 is high, while the load on the heater core 17 is as low as that applied for air-mixing. Thus, the flow rate of the coolant flowing through the heater core 17 is not necessarily high. Even the use of the pipe with the small diameter can ensure heating performance required for the heater core 17 to exhibit.

Figure 18:
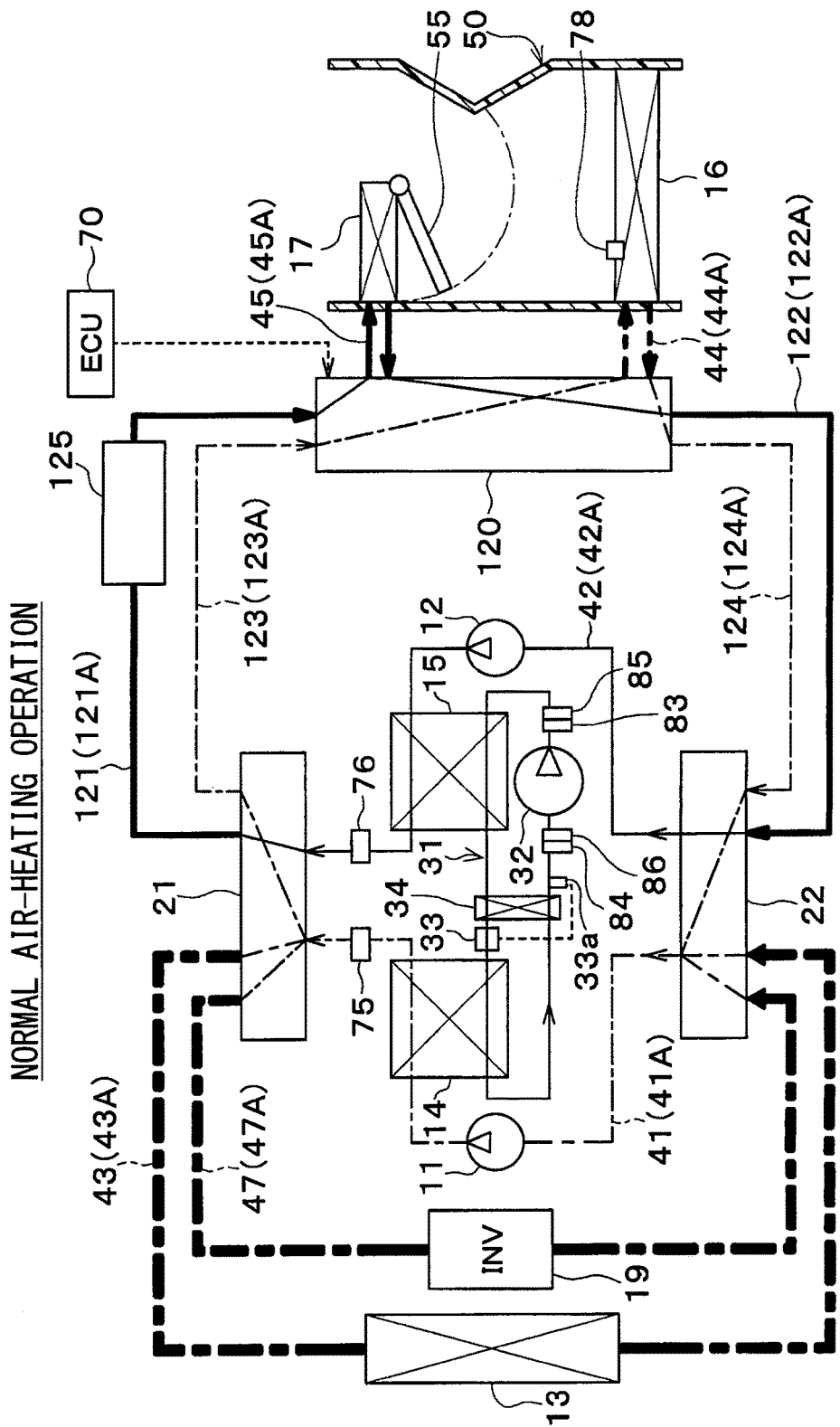
FIG. 18 is an entire configuration diagram showing a normal air-heating operation of the vehicle thermal management system in the eighth embodiment.

During the normal air-heating operation, as shown in FIG. 18, the controller 70 controls the operation of the flow-path switching valve 120 such that the coolant circulates between the coolant heater 15 and the heater core 17 through the first large-diameter flow path 121 and the second large-diameter flow path 122, which have the large diameters (in a first state).

During the normal air-heating operation, the controller 70 may control the operation of the flow-path switching valve 120 such that the coolant circulates between the coolant cooler 14 and the cooler core 16 through the first small-diameter flow path 123 and the second small-diameter flow path 124, which have the small diameters. That is, at the air-heating operation, the load on the heater core 17 is high, while the load on the cooler core 16 is as low as that applied for dehumidification. Thus, the flow rate of the coolant flowing through the cooler core 16 is not necessarily high. Even the use of the pipe with the small diameter can ensure the dehumidification performance required for the cooler core 16 to exhibit.

In this embodiment, the first small-diameter flow path 123 and the second small-diameter flow path 124 form a coolant flow path between the coolant cooler 14 and the cooler core 16, as well as a coolant flow path between the coolant heater 15 and the heater core 17.

The first large-diameter flow path 121 and the second large-diameter flow path 122 are arranged in parallel with the first small-diameter flow path 123 and the second small-diameter flow path 124, respectively. Each of the first and second large-diameter flow paths 121 and 122 has the inner diameter $\phi L$ larger than that of each of the first small-diameter flow path 123 and the second small-diameter flow path 124.

The flow-path switching valve 120 switches between the first state in which the coolant circulating through the cooler core 16 flows through the first large-diameter flow path 121 and the second large-diameter flow path 122, and the second state in which the coolant circulating through the cooler core 16 flows through the first small-diameter flow path 123 and the second small-diameter flow path 124 without flowing through the first and second large-diameter flow paths 121 and 122.

Likewise, the flow-path switching valve 120 switches between the first state in which the coolant circulating through the heater core 17 flows through the first and second large-diameter flow paths 121 and 122, and the second state in which the coolant circulating through the heater core 17 flows through the first and second small-diameter flow paths 123 and 124 and not through the first and second large-diameter flow paths 121 and 122.

Thus, in the second state, the volume of the coolant and the capacity of the coolant pipe can be reduced, compared to the first state, further decreasing the thermal capacity.

The controller 70 controls the operation of the flow-path switching valve 120 to switch to the second state when the absolute value of the difference between the target temperature TCO of the cooler core 16 and the actual temperature TC of the cooler core 16 exceeds the predetermined value.

Thus, at the cooling-down operation, the air conditioner is switched to the second state, in which the thermal capacity can be reduced, thereby improving the cooling-down performance.

The controller 70 may control the operation of the flow-path switching valve 120 to switch to the second state when the absolute value of the difference between a temperature associated with the target temperature TCO of the cooler core 16 and a temperature associated with the actual temperature TC of the cooler core 16 exceeds the predetermined value.

The controller 70 controls the operation of the flow-path switching valve 120 to switch to the second state when an absolute value of a difference between a target temperature THO of the heater core 17 and an actual temperature TH of the heater core 17 exceeds a predetermined value.

Thus, at the warming-up operation, the air conditioner is switched to the second state, in which the thermal capacity can be reduced, thereby improving the warming-up performance.

The controller 70 may control the operation of the flow-path switching valve 120 to switch to the second state when the absolute value of the difference between a temperature associated with the target temperature THO of the heater core 17 and a temperature associated with the actual temperature TH of the heater core 17 exceeds the predetermined value.

The controller 70 may control the operation of the flow-path switching valve 120 to switch to the second state when an absolute value of a difference between a target air outlet temperature TAO of the air blown into the vehicle interior and an actual temperature TAV of the air blown into the vehicle interior exceeds a predetermined value.

Thus, at the quick air-conditioning time (at the cooling-down operation or warming-up operation), the air conditioner can be switched to the second state to thereby reduce the thermal capacity, thus improving the quick air-conditioning performance (cooling-down performance and warming-up performance).

The controller 70 may control the operation of the flow-path switching valve 120 to switch to the second state when an absolute value of a difference between a temperature associated with the target air outlet temperature TAO of the air blown into the vehicle interior and a temperature associated with the actual temperature TAV of the air blown into the vehicle interior exceeds the predetermined value.

The controller 70 may control the operation of the flow-path switching valve 120 to switch to the second state when the blower 54 starts its operation.

Thus, at the quick air-conditioning time (at the cooling-down operation or warming-up operation), the air conditioner can be switched to the second state to thereby reduce the thermal capacity, thus improving the quick air-conditioning performance (cooling-down performance and warming-up performance).

The controller 70 controls the operation of the flow-path switching valve 120 to switch to the first state when the absolute value of the difference between the target temperature TCO of the cooler core 16 and the actual temperature TC of the cooler core 16 is less than the predetermined value.

Thus, at the normal air-cooling operation (non-cooling-down operation), the air conditioner can be switched to the first state to suppress the pressure loss in the pipe, thereby reducing the power consumption by the pump to enhance the air-cooling efficiency.

The controller 70 may control the operation of the flow-path switching valve 120 to switch to the first state when the absolute value of the difference between a temperature associated with the target temperature TCO of the cooler core 16 and a temperature associated with the actual temperature TC of the cooler core 16 is less than the predetermined value.

The controller 70 controls the operation of the flow-path switching valve 120 to switch to the first state when the absolute value of the difference between the target temperature THO of the heater core 17 and the actual temperature TH of the heater core 17 is less than the predetermined value.

Thus, at the normal air-heating operation (non-warming-up operation), the air conditioner can be switched to the first state to suppress the pressure loss in the pipe, thereby reducing the power consumption by the pump to enhance the air-heating efficiency.

The controller 70 may control the operation of the flow-path switching valve 120 to switch to the first state when the absolute value of the difference between a temperature associated with the target temperature THO of the heater core 17 and a temperature associated with the actual temperature TH of the heater core 17 is less than the predetermined value.

The controller 70 may control the operation of the flow-path switching valve 120 to switch to the first state when an absolute value of a difference between a target air outlet temperature TAO of the air blown into the vehicle interior and an actual temperature TAV of the air blown into the vehicle interior is less than a predetermined value.

Thus, at the normal air-conditioning time (at the normal air-cooling operation and the normal air-heating operation), the air conditioner can be switched to the first state to suppress the pressure loss in the pipe, thereby reducing the power consumption by the pump to enhance the air-conditioning efficiency.

The controller 70 may control the operation of the flow-path switching valve 120 to switch to the first state when an absolute value of a difference between a temperature associated with the target air outlet temperature TAO of the air blown into the vehicle interior and a temperature associated with the actual temperature TAV of the air blown into the vehicle interior is less than the predetermined value.

The controller 70 may control the operation of the flow-path switching valve 120 to switch to the first state when an absolute value of a difference between a target vehicle interior temperature set by the vehicle-interior temperature setting switch and an actual temperature of the vehicle interior is less than a predetermined value.

Thus, at the normal air-conditioning time (at the normal air-cooling operation and the normal air-heating operation), the air conditioner can be switched to the first state to suppress the pressure loss in the pipe, thereby reducing the power consumption by the pump to enhance the air-conditioning efficiency.

When switching from the first state to the second state, the flow-path switching valve 120 gradually increases the flow rate of the coolant flowing through the first and second large-diameter flow paths 121 and 122. This can suppress fluctuations in temperature of the ventilation air blown out of the cooler core 16 and in temperature of the ventilation air blown out of the heater core 17.

Ninth Embodiment

Figure 19:
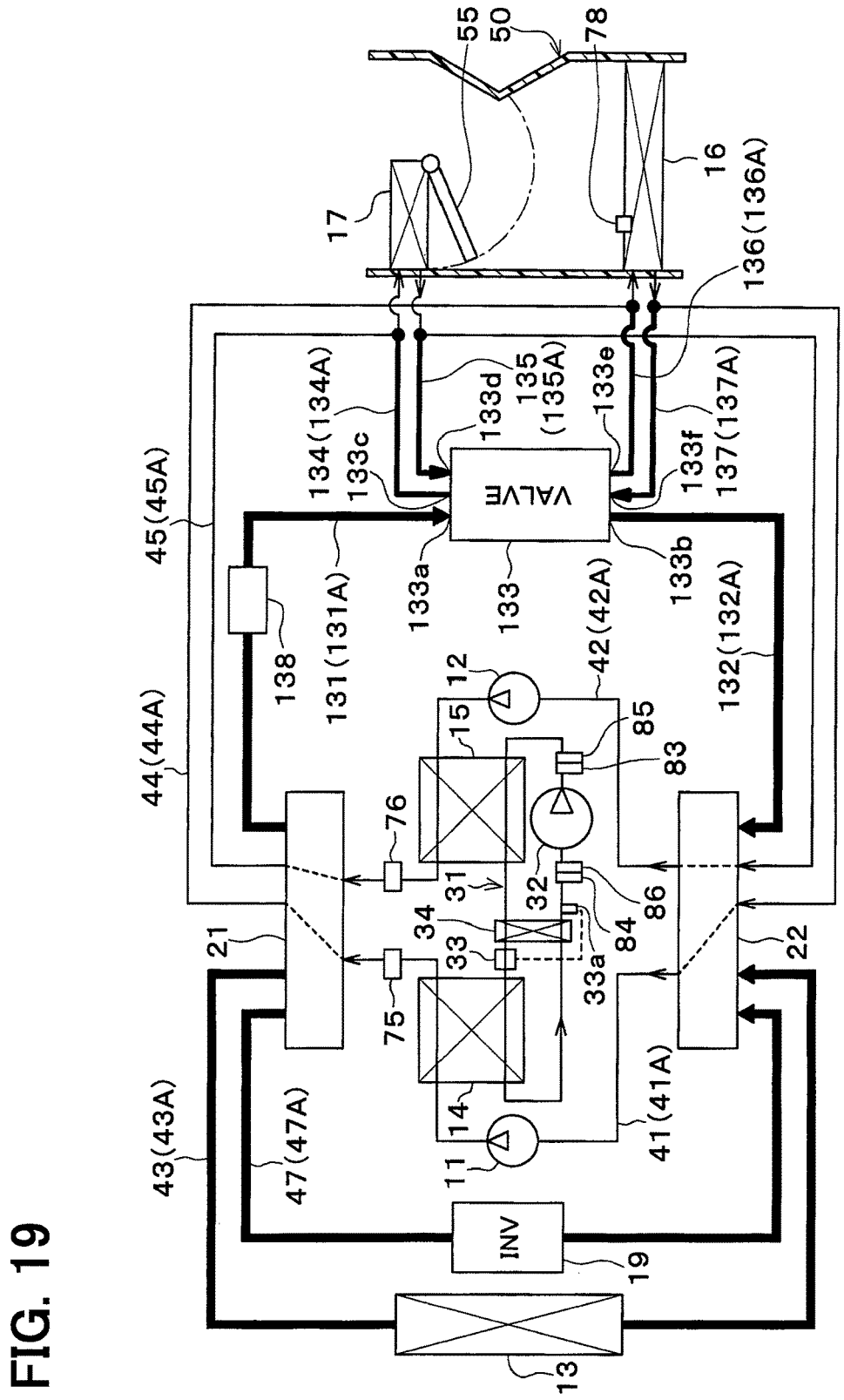
FIG. 19 is an entire configuration diagram of a vehicle thermal management system according to a ninth embodiment.

In this embodiment, as shown in FIG. 19, one end of a first common flow path 131 is coupled to the coolant outlet side of the first switching valve 21, and the one end of a second common flow path 132 is coupled to the coolant inlet side of the second switching valve 22.

The first switching valve 21 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to the first common flow path 131.

The second switching valve 22 switches among a state in which the coolant flows out to the first pump 11, a state in which the coolant flows out to the second pump 12, and a state in which the coolant flows out to neither the first pump 11 nor the second pump 12, with respect to the second common flow path 132.

The other end of the first common flow path 131 is coupled to a first coolant inlet 133a of a flow-path switching device 133. The other end of the second common flow path 132 is coupled to a first coolant outlet 133b of the flow-path switching device 133.

One end of a first heater-core connection flow path 134 is coupled to a second coolant outlet 133c of the flow-path switching device 133. One end of a second heater-core connection flow path 135 is coupled to a second coolant inlet 133d of the flow-path switching device 133.

The other end of the first heater-core connection flow path 134 is coupled to the coolant inlet side of the heater core 17 in the heater-core flow path 45. The other end of the second heater-core connection flow path 135 is coupled to the coolant outlet side of the heater core 17 in the heater-core flow path 45.

One end of a first cooler-core connection flow path 136 is coupled to a third coolant outlet 133e of the flow-path switching device 133. One end of a second cooler-core connection flow path 137 is coupled to a third coolant inlet 133f of the flow-path switching device 133.

The other end of the first cooler-core connection flow path 136 is coupled to the coolant inlet side of the cooler core 16 in the cooler-core flow path 44. The other end of the second cooler-core connection flow path 137 is coupled to the coolant outlet side of the cooler core 16 in the cooler-core flow path 44.

The diameter φL of each of the first and second common flow paths 131 and 132 is larger than each of the diameter φC of the cooler-core flow path 44 and the diameter φH of the heater-core flow path 45. In other words, the inner diameter φL of each of the common pipes 131A and 132A forming the first and second common flow paths 131 and 132, respectively, is larger than each of the inner diameter φC of the cooler-core pipe 44A forming the cooler-core flow path 44 and the inner diameter φH of the heater-core pipe 45A forming the heater-core flow path 45.

The common pipes 131A and 132A are disposed in parallel with the cooler-core pipe 44A and the heater-core pipe 45A, respectively. That is, the cooler-core pipe 44A and the heater-core pipe 45A are the small-inner-diameter pipes, and the common pipes 131A and 132A are the parallel pipes.

The diameter φM of each of the first and second heater-core connection flow paths 134 and 135 and the first and second cooler-core connection flow paths 136 and 137 is smaller than the diameter φL of each of the first and second common flow paths 131 and 132, and larger than each of the diameter φC of the cooler-core flow path 44 and the diameter φH of the heater-core flow path 45.

In other words, the inner diameter φL of each of the connection pipes 134A, 135A, 136A, and 137A forming the first and second heater-core connection flow paths 134 and 135 and the first and second cooler-core connection flow paths 136 and 137, respectively, is smaller than the inner diameter φL of each of the common pipes 131A and 132A forming the first and second common flow paths 131 and 132. Furthermore, the inner diameter φL of each of the connection pipes 134A, 135A, 136A, and 137A is larger than each of the inner diameter φC of the cooler-core pipe 44A forming the cooler-core flow path 44 and the inner diameter φH of the heater-core pipe 45A forming the heater-core flow path 45.

A cold-heat storage portion 138 is provided in the first common flow path 131. The cold-heat storage portion 138 stores therein hot heat or cold heat contained in the coolant. Examples of the cold-heat storage portion 138 can include a chemical heat-storage material, a thermal insulation tank, and a latent-heat type heat storage member (paraffin or hydrate material). The thermal insulation tank may be formed by locally enlarging the diameter of the first common flow path 131.

Figure 20:
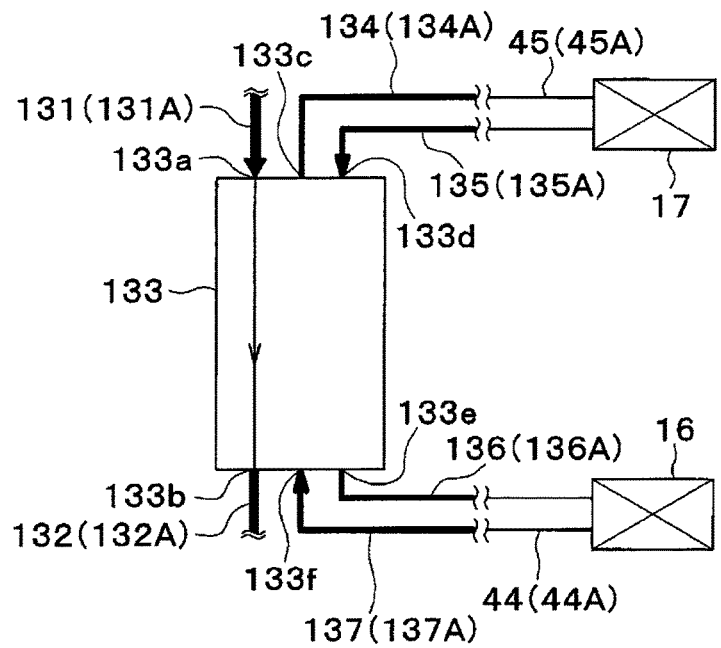
FIG. 20 is a diagram showing an operation of a flow-path switching device in a warming-up/cooling-down state in the ninth embodiment.
Figure 21:
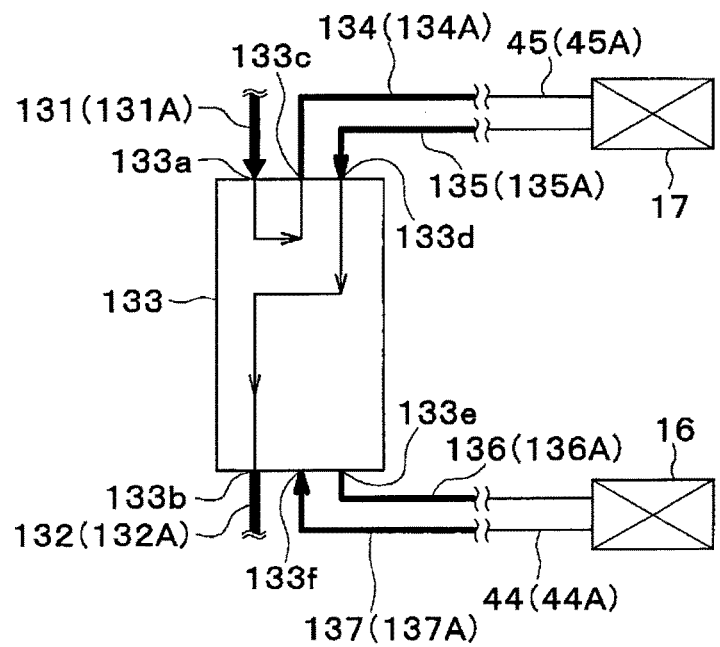
FIG. 21 is a diagram showing an operation of the flow-path switching device in a steady-air-heating/heat-storage-use air-heating state in the ninth embodiment.
Figure 22:
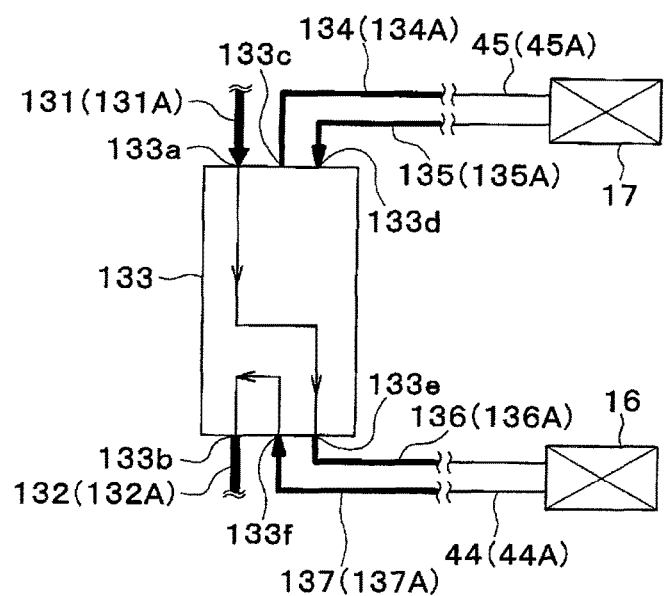
FIG. 22 is a diagram showing an operation of the flow-path switching device in a steady-air-cooling/cold-storage-use air-cooling state in the ninth embodiment.

The flow-path switching device 133 switches among the warming-up/cooling-down state shown in FIG. 20, the steady-air-heating/heat-storage-use air-heating state shown in FIG. 21, and the stead-air-cooling/cold-storage-use air-cooling state shown in FIG. 22.

The operation of the flow-path switching device 133 is controlled by the controller 70. That is, the controller 70 serves as a flow-path switching control unit that controls the operation of the flow-path switching valve 133.

In the warming-up/cooling-down state shown in FIG. 20, the first common flow path 131 is connected to the second common flow path 132.

In this way, the coolant circulates between the coolant cooler 14 and the cooler core 16 through the cooler-core flow path 44 with the small diameter, while the coolant circulates between the coolant heater 15 and the heater core 17 through the heater-core flow path 45 with the small diameter. As a result, the coolant temperature can be quickly decreased to the desired temperature at the cooling-down operation, and the coolant temperature can be quickly increased to the desired temperature at the warming-up operation.

The cold-heat storage portion 138 is disposed in neither the cooler-core flow path 44 nor the heater-core flow path 45, but disposed in the first common flow path 131. In the warming-up/cooling-down state, the coolant circulating through the cooler core 16 does not flow through the cold-heat storage portion 138, and the coolant circulating through the heater core 17 does not flow through the cold-heat storage portion 138. Thus, the coolant temperature can be quickly decreased to the desired temperature without losing the cold heat of the coolant into the cold-heat storage portion 138 at the cooling-down operation, while the coolant temperature can be quickly increased to the desired temperature without losing the hot heat of the coolant into the cold-heat storage portion 138 at the warming-up operation.

In the steady-air-heating/heat-storage-use air-heating state shown in FIG. 21, the first common flow path 131 is connected to the first heater-core connection flow path 134, and the second heater-core connection flow path 135 is connected to the second common flow path 132.

Thus, the coolant circulates between the coolant cooler 14 and the cooler core 16 through the cooler-core flow path 44 with the small diameter, while the coolant circulates between the coolant heater 15 and the heater core 17 through the first common flow path 131 and the second common flow path 132, which have the large diameters, thereby enabling the improvement of the air-heating efficiency at the steady-air-heating operation.

The cold-heat storage portion 138 is disposed in the first common flow path 131, so that the hot heat stored in the cold-heat storage portion 138 can be used to perform air-heating at the heat-storage-use air-heating operation.

In the steady-air-cooling/cold-storage-use air-cooling state shown in FIG. 22, the first common flow path 131 is connected to the first cooler-core connection flow path 136, and the second cooler-core connection flow path 137 is connected to the second common flow path 132.

Thus, the coolant circulates between the coolant cooler 14 and the cooler core 16 through the first common flow path 131 and the second common flow path 132, which have the large diameters, while the coolant circulates between the coolant heater 15 and the heater core 17 through the cooler-core flow path 44 with the small diameter, thereby enabling the improvement of the air-cooling efficiency at the steady-air-cooling operation.

The cold-heat storage portion 138 is disposed in the first common flow path 131, so that the cold heat stored in the cold-heat storage portion 138 can be used to perform air-cooling at the cold-storage-use air-cooling operation.

Tenth Embodiment

Figure 23:
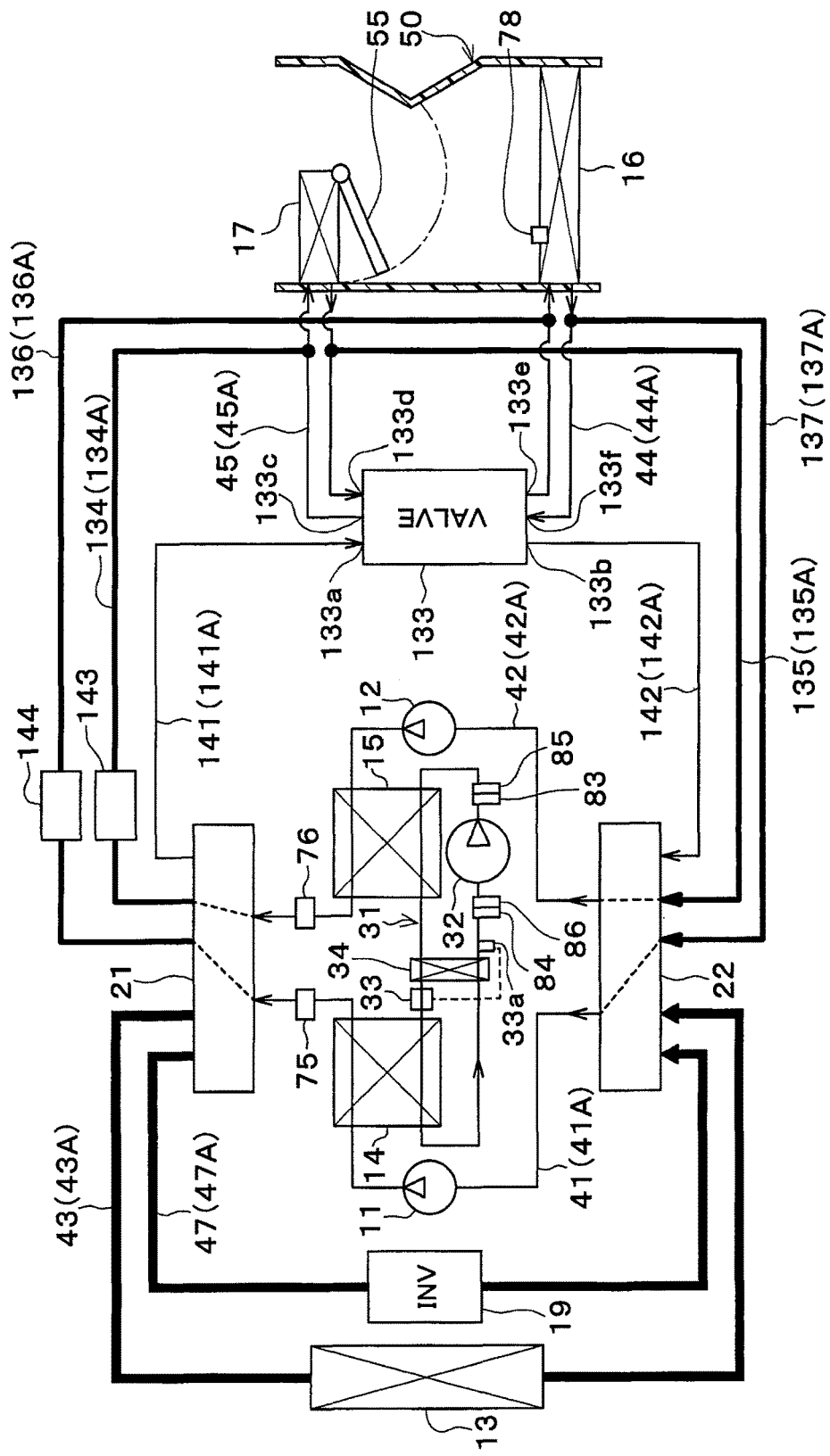
FIG. 23 is an entire configuration diagram of a vehicle thermal management system according to a tenth embodiment.

In this embodiment, as shown in FIG. 23, one end of a first common flow path 141 is coupled to the coolant outlet side of the first switching valve 21, and the one end of a second common flow path 142 is coupled to the coolant inlet side of the second switching valve 22.

The other end of the first common flow path 141 is coupled to the first coolant inlet 133a of the flow-path switching device 133. The other end of the second common flow path 142 is coupled to the first coolant outlet 133b of the flow-path switching device 133.

One end of the heater-core flow path 45 is coupled to the second coolant outlet 133c of the flow-path switching device 133. The other end of the heater-core flow path 45 is coupled to the second coolant inlet 133d of the flow-path switching device 133.

One end of the cooler-core flow path 44 is coupled to the third coolant outlet 133e of the flow-path switching device 133. The other end of the cooler-core flow path 44 is coupled to the third coolant inlet 133f of the flow-path switching device 133.

One end of the first heater-core connection flow path 134 is coupled to the second-pump flow path 42 via the first switching valve 21. The other end of the first heater-core connection flow path 134 is coupled to the coolant inlet side of the heater core 17 in the heater-core flow path 45.

One end of the second heater-core connection flow path 135 is coupled to the second-pump flow path 42 via the second switching valve 22. The other end of the second heater-core connection flow path 135 is coupled to the coolant outlet side of the heater core 17 in the heater-core flow path 45.

One end of the first cooler-core connection flow path 136 is coupled to the first-pump flow path 41 via the first switching valve 21. The other end of the first cooler-core connection flow path 136 is coupled to the coolant inlet side of the cooler core 16 in the cooler-core flow path 44.

One end of the second cooler-core connection flow path 137 is coupled to the first-pump flow path 41 via the second switching valve 22. The other end of the second cooler-core connection flow path 137 is coupled to the coolant outlet side of the cooler core 16 in the cooler-core flow path 44.

The first switching valve 21 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to the first common flow path 141.

The second switching valve 22 switches among a state in which the coolant flows out to the first pump 11, a state in which the coolant flows out to the second pump 12, and a state in which the coolant flows out to neither the first pump 11 nor the second pump 12, with respect to the second common flow path 142.

Each of the diameters φS of the first and second common flow paths 141 and 142, the diameter φC of the cooler-core flow path 44 and the diameter φH of the heater-core flow path 45 is smaller than the diameter φM of each of the first and second heater-core connection flow paths 134 and 135 and the first and second cooler-core connection flow paths 136 and 137.

In other words, each of the inner diameters φS of the common pipes 141A and 142A forming the first and second common flow paths 141 and 142, the inner diameter φC of the cooler-core pipe 44A forming the cooler-core flow path 44, and the inner diameter φH of the heater-core pipe 45A forming the heater-core flow path 45 is smaller than the inner diameter φM of each of the connection pipes 134A, 135A, 136A, and 137A forming the first and second heater-core connection flow paths 134 and 135 and the first and second cooler-core connection flow paths 136 and 137.

The connection pipes 134A, 135A, 136A, and 137A are disposed in parallel with the common pipes 141A and 142A. That is, the common pipes 141A and 142A are the small-diameter pipes, and the connection pipes 134A, 135A, 136A, and 137A are the parallel pipes.

A heat storage portion 143 is provided in the first heater-core connection flow path 134. A cold storage portion 144 is provided in the first cooler-core connection flow path 136. The heat storage portion 143 stores hot heat contained in the coolant flowing through the first heater-core connection flow path 134. The cold storage portion 144 stores cold heat contained in the coolant flowing through the first cooler-core connection flow path 136. Examples of the heat storage portion 143 and the cold storage portion 144 can include a chemical heat-storage material, a thermal insulation tank, and a latent-heat type heat storage member (paraffin or hydrate material). The thermal insulation tank may be formed by locally enlarging the diameters of the connection flow paths 134 and 135.

Figure 24:
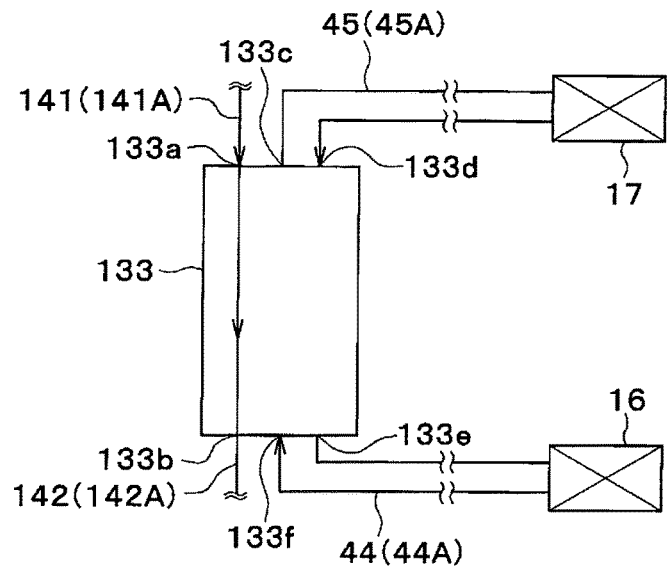
FIG. 24 is a diagram showing an operation of the flow-path switching device in a dehumidification and air-heating state in the tenth embodiment.
Figure 25:
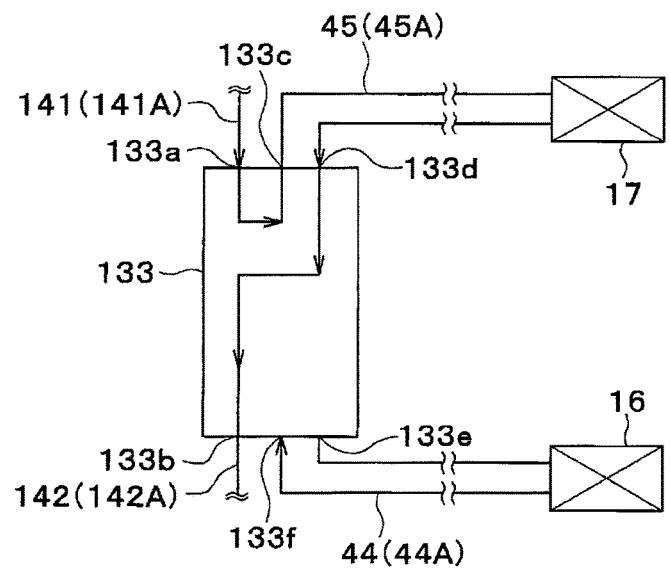
FIG. 25 is a diagram showing an operation of the flow-path switching device in a warming-up/steady-air-cooling/cold-storage-use air-cooling state in the tenth embodiment.
Figure 26:
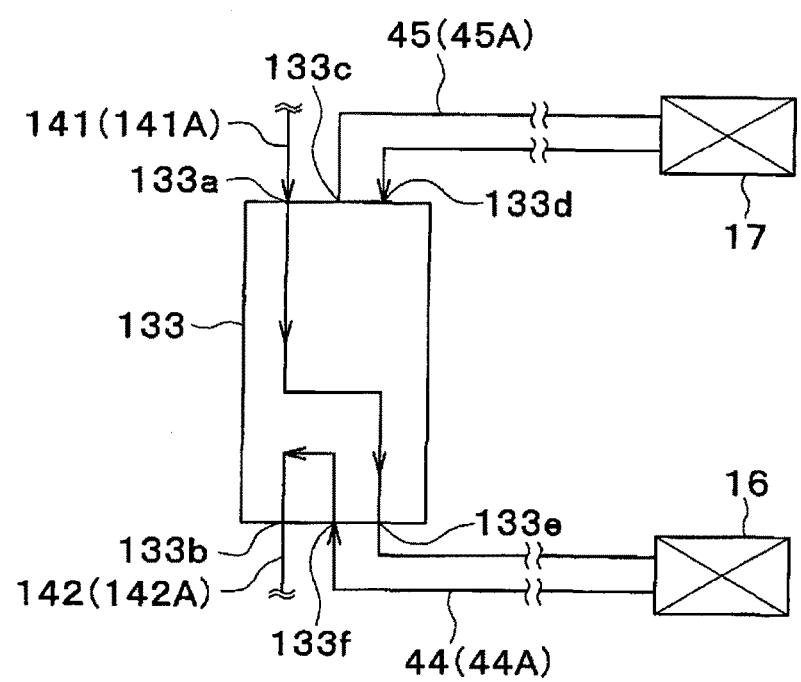
FIG. 26 is a diagram showing an operation of the flow-path switching device in a cooling-down/steady-air-heating/heat-storage-use air-heating state in the tenth embodiment.

The flow-path switching device 133 is adapted to switch among a dehumidification and air-heating state shown in FIG. 24, a warming-up/steady-air-cooling/cold-storage-use air-cooling state shown in FIG. 25, and a cooling-down/steady-air-heating/heat-storage-use air-heating state shown in FIG. 26.

In the dehumidification and air-heating state shown in FIG. 24, the first common flow path 141 and the second common flow path 142 are connected together. Thus, the coolant circulates between the coolant cooler 14 and the cooler core 16 through the first cooler-core connection flow path 136 and the second cooler-core connection flow path 137, which have the large diameters. Simultaneously, the coolant circulates between the coolant heater 15 and the heater core 17 through the first heater-core connection flow path 134 and the second heater-core connection flow path 135, which have the large diameters. Thus, the dehumidification efficiency and the air-heating efficiency can be improved at the dehumidification and air-heating operation.

The cold storage portion 144 is disposed in the first cooler-core connection flow path 136, so that the cold heat stored in the cold storage portion 144 can be used to perform dehumidification at the dehumidification and air-heating operation.

The heat storage portion 143 is disposed in the first heater-core connection flow path 134, so that the hot heat stored in the heat storage portion 143 can be used to perform air-heating at the dehumidification and air-heating operation.

In the warming-up/steady-air-cooling/cold-storage-use air-cooling state shown in FIG. 25, the first common flow path 131 is connected to one end of the heater-core flow path 45, and the second common flow path 132 is connected to the other end of the heater-core flow path 45.

Thus, the coolant circulates between the coolant cooler 14 and the cooler core 16 through the first cooler-core connection flow path 136 and the second cooler-core connection flow path 137, which have the large diameters. Simultaneously, the coolant circulates between the coolant heater 15 and the heater core 17 through the first common flow path 141, the heater-core flow path 45, and the second common flow path 142, which have the small diameters. Therefore, the coolant temperature can be quickly increased to the desired temperature at the warming-up operation, and the air-cooling efficiency can be enhanced at the steady-air-cooling operation.

The cold storage portion 144 is disposed in the first cooler-core connection flow path 136, so that the cold heat stored in the cold storage portion 144 can be used to perform dehumidification at the cold-storage-use air-cooling operation.

In the cooling-down/steady-air-heating/heat-storage-use air-heating state shown in FIG. 26, the first common flow path 141 is connected to one end of the cooler-core flow path 44, and the second common flow path 142 is connected to the other end of the cooler-core flow path 44.

Thus, the coolant circulates between the coolant cooler 14 and the cooler core 16 through the first common flow path 141, the cooler-core flow path 44, and the second common flow path 142, which have the small diameters. Simultaneously, the coolant circulates between the coolant heater 15 and the heater core 17 through the first heater-core connection flow path 134 and the second heater-core connection flow path 135, which have the large diameters. Thus, the coolant temperature can be quickly decreased to the desired temperature at the cooling-down operation, and the air-heating efficiency can be enhanced at the steady-air-heating operation.

The heat storage portion 143 is disposed in the first heater-core connection flow path 134, so that the hot heat stored in the heat storage portion 143 can be used to perform air-heating at the heat-storage-use air-heating operation.

Other Embodiments

The above-mentioned embodiments can be appropriately combined together. Further, various modifications and changes can be made to these embodiments described above, for example, as follows.

(1) Although in each of the above-mentioned embodiments, the coolant is used as the heat medium for adjusting the temperature of a temperature-adjustment target device, various kinds of media, such as oil, may be used as the heat medium.

Alternatively, nanofluid may be used as the heat medium. The nanofluid is a fluid containing nanoparticles having a diameter of the order of nanometer. By mixing the nanoparticles into the heat medium, the following functions and effects can be obtained, in addition to the function and effect of decreasing a freezing point, like a coolant (so-called antifreeze) using ethylene glycol.

That is, the use of the nanoparticles exhibits the functions and effects of improving the thermal conductivity in a specific temperature range, increasing the thermal capacity of the heat medium, preventing the corrosion of a metal pipe and the degradation of a rubber pipe, and enhancing the fluidity of the heat medium at an ultralow temperature.

The functions and effects vary depending on the configuration, shape, and blending ratio of the nanoparticles, and additive material.

Thus, the mixture of nanoparticles in the heat medium can improve its thermal conductivity, and thus even in a small amount, can exhibit the substantially same cooling efficiency as the coolant using ethylene glycol.

Further, such a heat medium can also improve its thermal capacity and increase a cold-heat storage amount (cold-heat storage due to its sensible heat) of the heat medium itself.

By increasing the cold-heat storage amount, the temperature adjustment, including cooling and heating of the device, can be performed using the cold-heat storage for some time period even though the compressor 32 is not operated, which can save the power of the vehicle thermal management system.

An aspect ratio of the nanoparticle is preferably 50 or more. This is because such an aspect ratio can provide the adequate thermal conductivity. Note that the aspect ratio of the nanoparticle is a shape index indicating the ratio of the width to the height of the nanoparticle.

Nanoparticles suitable for use can include any one of Au, Ag, Cu, and C. Specifically, atoms configuring the nanoparticles can include an Au nanoparticle, an Ag nanowire, a carbon nanotube (CNT), a graphene, a graphite core-shell nanoparticle (a particle body with the above-mentioned atom surrounded by a structure of a carbon nanotube and the like), an Au nanoparticle-containing CNT, and the like.

(2) In the refrigeration cycle 31 of each of the above-mentioned embodiments, fluorocarbon refrigerant is used as the refrigerant. However, the kind of refrigerant is not limited thereto, and may be natural refrigerant, such as carbon dioxide, a hydrocarbon refrigerant, and the like.

The refrigeration cycle 31 in each of the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

(3) Although in the above-mentioned embodiments, the coolant discharged from the first pump 11 or second pump 12 exchanges heat with the engine coolant in the engine cooling circuit 60 via the coolant-to-coolant heat exchanger 18, the coolant discharged from the first pump 11 or second pump 12 may circulate through the engine cooling circuit 60 via a flow-path switching valve.

In this embodiment, the coolant flow path for the engine 61 constitutes an engine heat transfer portion (heat transfer portion) that transfers heat between the engine 61 and the coolant.

In this embodiment, the coolant flow path for the engine 61 constitutes a coolant heating portion (heat-medium heating portion) that heats the coolant by using the waste heat from the engine 61.

The flow-path switching valve is a switching device that switches the coolant discharged from the first pump 11 or second pump 12 between a state in which it circulates through the engine cooling circuit 60 and a state in which it does not circulate therethrough.

Figure 27:
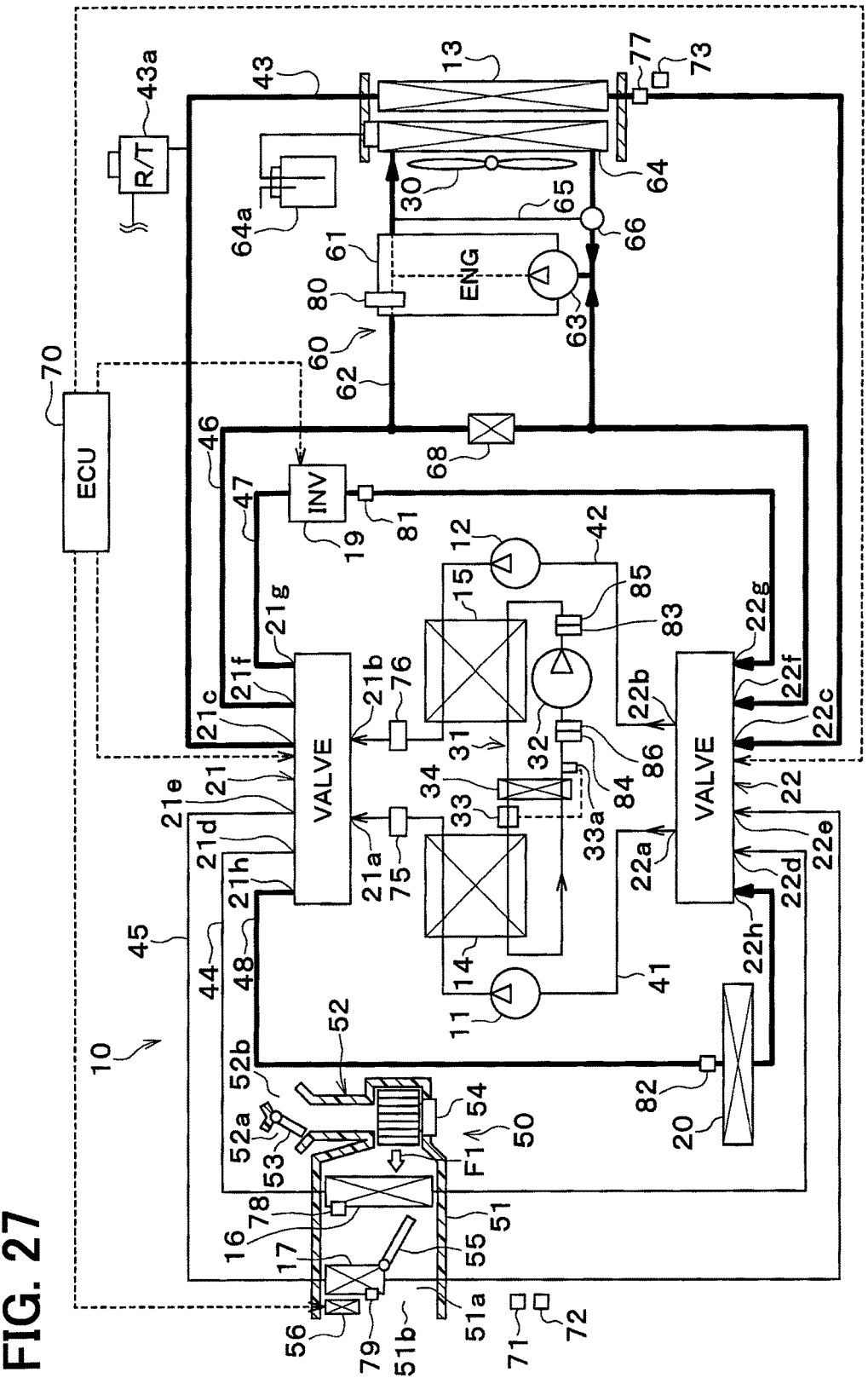
FIG. 27 is an entire configuration diagram of a vehicle thermal management system according to another embodiment.

For example, as shown in FIG. 27, the coolant-to-coolant heat exchanger flow path 46 in the above-mentioned first embodiment (see FIG. 1) may be connected to the circulation flow path 62 in the engine cooling circuit 60, whereby the coolant discharged from the first pump 11 or second pump 12 may circulate through the engine cooling circuit 60 via the first switching valve 21 and the second switching valve 22.

Figure 28:
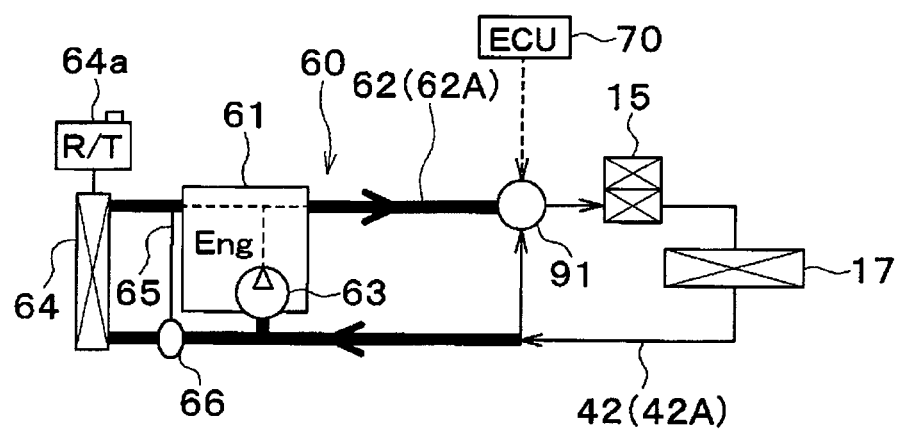
FIG. 28 is an entire configuration diagram of a vehicle thermal management system according to a further embodiment.

(4) In the above-mentioned second embodiment (see FIG. 4), the heater core 17 is disposed in the circulation flow path 62 of the engine cooling circuit 60. Alternatively, as shown in FIG. 28, the heater core 17 may be disposed in the second-pump flow path 42, and the second-pump flow path 42 may be coupled to the circulation flow path 62 of the engine cooling circuit 60 via the three-way valve 91.

The three-way valve 91 is a switching device that switches between the state in which the coolant heated by the engine 61 and the coolant heater 15 flows through the heater core 17 and the state in which the coolant heated by the coolant heater 15 flows through the heater core 17.

(5) Although in the above-mentioned embodiments, the inverter 19 is provided as a heat generating device, various other heat generating devices in addition to the inverter 19 may be provided. Other examples of various heat generating devices include a traveling electric motor, various engine components, and the like.

Various engine components can include a turbocharger, an intercooler, an EGR cooler, a CVT warmer, a CVT cooler, an exhaust-heat recovery device, and the like.

The turbocharger is a supercharger that supercharges intake air of the engine (intake). The intercooler is an intake cooler (intake heat-medium heat exchanger) that cools a supercharged intake air by exchanging heat between the coolant and the supercharged intake air at a high temperature compressed by the turbocharger.

The EGR cooler is an exhaust-air coolant heat exchanger (exhaust-air heat-medium heat exchanger) that cools exhaust air by exchanging heat between the coolant and an engine exhaust gas (exhaust air) to be returned to the intake side of the engine.

The continuously variable transmission (CVT) warmer is a lubricating-oil coolant heat exchanger (lubricating-oil heat-medium heat exchanger) that heats a lubricating oil (CVT oil) by exchanging heat between the coolant and the CVT oil for lubricating the CVT.

The CVT cooler is a lubricating-oil coolant heat exchanger (lubricating-oil heat-medium heat exchanger) that cools the CVT oil by exchanging heat between the coolant and the CVT oil.

The exhaust-heat recovery device is an exhaust-air coolant heat exchanger (exhaust-air heat-medium heat exchanger) that exchanges heat between the exhaust air and the coolant, thereby absorbing heat from the exhaust air into the coolant.

What is claimed is:

1. An air conditioner, comprising:
a pump adapted to draw and discharge a heat medium;
a first heat exchanger that cools or heats the heat medium so as to adjust a temperature of the heat medium;
a second heat exchanger that exchanges heat between the heat medium having the temperature adjusted by the first heat exchanger and ventilation air to be blown into a space to be air-conditioned;
a heat transfer portion having a flow path through which the heat medium circulates, the heat transfer portion being adapted to transfer heat with the heat medium having the temperature adjusted by the first heat exchanger;
a large-inner-diameter pipe that forms a heat-medium flow path between the first heat exchanger and the heat transfer portion;
a small-inner-diameter pipe that forms a heat-medium flow path between the first heat exchanger and the second heat exchanger, the small-inner-diameter pipe having an inner diameter smaller than that of the large-inner-diameter pipe;
a parallel pipe forming a heat-medium flow path between the first heat exchanger and the second heat exchanger, the parallel pipe being disposed in parallel with at least a part of the small-inner-diameter pipe, the parallel pipe having an inner diameter larger than that of the small-inner-diameter pipe; and
a flow-path switching valve configured to switch between a first state in which the heat medium circulating through the second heat exchanger flows through the parallel pipe, and a second state in which the heat medium circulating through the second heat exchanger does not flow through the parallel pipe but flows through the small-inner diameter pipe.

2. The air conditioner according to claim 1, further comprising:
a switching valve that switches between a state in which the heat medium having the heat transferred by the heat transfer portion flows into the second heat exchanger and a state in which the heat medium does not flow into the second heat exchanger, wherein
the heat transfer portion is one of a heat-medium heating portion that heats the heat medium using waste heat from an engine.

3. The air conditioner according to claim 2, wherein
the switching valve switches between a state in which the heat medium having the heat transferred by the heat transfer portion flows into the second heat exchanger, and a state in which the heat medium having the temperature adjusted by the first heat exchanger flows into the second heat exchanger, and
the first heat exchanger is a heat-medium heating heat exchanger that heats the heat medium by exchanging heat between a high-pressure side refrigerant in a refrigeration cycle and the heat medium.

4. The air conditioner according to claim 1, further comprising:
a switching valve that switches between a circulation state in which the heat medium circulates and a non-circulation state in which the heat medium does not circulate, between the heat transfer portion and the second heat exchanger; and
a controller configured to control an operation of the switching valve to switch to the non-circulation state at a start-up of air-conditioning.

5. The air conditioner according to claim 1, further comprising:
a controller configured to control an operation of the flow-path switching valve to switch to the second state when an absolute value of a difference between a temperature associated with a target temperature of the second heat exchanger and a temperature associated with a temperature of the second heat exchanger exceeds a predetermined value.

6. The air conditioner according to claim 1, further comprising:
a blower adapted to generate the ventilation air, and a controller configured to control an operation of the flow-path switching valve to switch to the second state when the blower starts to operate.

7. The air conditioner according to claim 1, further comprising:
a controller configured to control an operation of the flow-path switching valve to switch to the first state when an absolute value of a difference between a temperature associated with a target temperature of the second heat exchanger and a temperature associated with a temperature of the second heat exchanger is less than a predetermined value.

8. The air conditioner according to claim 1, further comprising:
a controller configured to control an operation of the flow-path switching valve to switch to the first state when an absolute value of a difference between a target temperature of the space to be air-conditioned and a temperature of the space to be air-conditioned is less than a predetermined value.

9. The air conditioner according to claim 1, wherein the flow-path switching valve gradually increases a flow rate of the heat medium flowing though the parallel pipe, to suppress fluctuations in temperature of the ventilation air blown from the second heat exchanger when switching from the first state to the second state.

10. The air conditioner according to claim 1, further comprising: a cold-heat storage portion disposed in the parallel pipe and adapted to store cooling capacity and heating capacity contained in the heat medium.

11. The air conditioner according to claim 1, wherein the heat transfer portion is a heat-medium outside-air heat exchanger that exchanges heat between the heat medium and outside air.

* * * * *